US011800559B2

(12) United States Patent
Sun et al.

(10) Patent No.: US 11,800,559 B2
(45) Date of Patent: Oct. 24, 2023

(54) USER EQUIPMENT SIDE ENHANCED CLEAR CHANNEL ASSESSMENT LENGTH INDICATION

(71) Applicant: QUALCOMM Incorporated, San Diego, CA (US)

(72) Inventors: Jing Sun, San Diego, CA (US); Vinay Chande, San Diego, CA (US); Arumugam Chendamarai Kannan, San Diego, CA (US); Srinivas Yerramalli, Hyderabad (IN); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 110 days.

(21) Appl. No.: 17/170,015

(22) Filed: Feb. 8, 2021

(65) Prior Publication Data

US 2021/0250999 A1    Aug. 12, 2021

Related U.S. Application Data

(60) Provisional application No. 62/972,623, filed on Feb. 10, 2020.

(51) Int. Cl.
*H04W 74/08* (2009.01)
*H04W 72/1268* (2023.01)
*H04W 72/23* (2023.01)

(52) U.S. Cl.
CPC ... *H04W 74/0808* (2013.01); *H04W 72/1268* (2013.01); *H04W 72/23* (2023.01)

(58) Field of Classification Search
CPC ......... H04W 74/0808; H04W 72/1268; H04W 72/1289; H04W 72/14; H04L 1/1867; H04L 1/1896; H04L 1/1854
See application file for complete search history.

(56) References Cited

U.S. PATENT DOCUMENTS

2017/0013479 A1\*  1/2017  Sun ..................... H04L 27/2601
2018/0110071 A1   4/2018  Mukherjee et al.
2019/0141727 A1\*  5/2019  Si .......................... H04L 1/1887
(Continued)

OTHER PUBLICATIONS

International Search Report and Written Opinion—PCT/US2021/017239—ISA/EPO—dated May 21, 2021.
(Continued)

*Primary Examiner* — Min Jung
(74) *Attorney, Agent, or Firm* — Holland & Hart LLP/Qualcomm Incorporated

(57) ABSTRACT

Methods, systems, and devices for wireless communications are described. A user equipment (UE) may receive a grant scheduling an acknowledgement feedback transmission for the grant. The UE may identify, based at least in part on a first timing associated with the grant, a second timing associated with the acknowledgment feedback transmission, or a combination thereof, a duration for a channel clearance procedure to be performed before transmitting the acknowledgement feedback transmission. The UE may perform the channel clearance procedure using the identified duration. The UE may transmit the acknowledgement feedback transmission based at least in part on a result of the channel clearance procedure.

30 Claims, 18 Drawing Sheets

(56) References Cited

U.S. PATENT DOCUMENTS

| | | | |
|---|---|---|---|
| 2020/0029221 A1* | 1/2020 | Xue | H04W 72/10 |
| 2020/0037359 A1* | 1/2020 | Wang | H04L 1/1887 |
| 2020/0053793 A1* | 2/2020 | Loehr | H04W 72/042 |
| 2021/0167900 A1* | 6/2021 | Karaki | H04L 1/1822 |
| 2021/0250982 A1* | 8/2021 | Sun | H04L 27/0006 |
| 2021/0250998 A1* | 8/2021 | Sun | H04L 5/0094 |

OTHER PUBLICATIONS

LG Electronics: "HARQ Procedure for NR-U", 3GPP TSG RAN WG1 #99, 3GPP Draft; R1-1912391, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 18, 2019-Nov. 22, 2019, Nov. 9, 2019 (Nov. 9, 2019), 22 Pages, XP051823397, Retrieved from the Internet: URL: https://ftp.3gpp.org/tsg_ran/WG1_RL1/TSGR1_99/Docs/R1-1912391. zip R1-1912391 NR-U HARQ_Final.doc [retrieved on Nov. 9, 2019] p. 4.

OPPO: "Channel Access Procedures for NR-U", 3GPP TSG RAN WG1 #99, 3GPP Draft; R1-1912506, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 18, 2019-Nov. 22, 2019, Nov. 9, 2019 (Nov. 9, 2019), 10 Pages, XP051823446, Retrieved from the Internet: URL: https://ftp.3gpp.org/tsg_ran/WG1_RL1/TSGR1_99/Docs/R1-1912506. zip R1-1912506.docx [retrieved on Nov. 9, 2019] pp. 5-6.

SAMSUNG: "Channel Access Procedures for NR-U", 3GPP TSG-RAN WG1 Meeting #99, 3GPP Draft; R1-1912449, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 18, 2019-Nov. 22, 2019, pp. 1-13, Nov. 8, 2019 (Nov. 8, 2019), XP051823426, Retrieved from the Internet: URL: https://ftp.3gpp.org/tsg_ran/WG1_RL1/TSGR1_99/Docs/R1-1912449.zip R1-1912449-Channel access procedures for NR-U. docx [retrieved on Nov. 8, 2019] p. 2, sections 1-7.

* cited by examiner

USER EQUIPMENT SIDE ENHANCED CLEAR CHANNEL ASSESSMENT LENGTH INDICATION

CROSS REFERENCE

The present application for patent claims the benefit of U.S. Provisional Patent Application No. 62/972,623 by SUN et al., entitled "USER EQUIPMENT SIDE ENHANCED CLEAR CHANNEL ASSESSMENT LENGTH INDICATION," filed Feb. 10, 2020, assigned to the assignee hereof, and expressly incorporated by reference herein.

FIELD OF TECHNOLOGY

The following relates generally to wireless communications and more specifically to user equipment (UE) side enhanced clear channel assessment (eCCA) length indication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support user equipment (UE) side enhanced clear channel assessment (eCCA) length indication. Generally, the described techniques provide various mechanisms that support wireless communications in a wireless network. Broadly, aspects of the described techniques support various mechanisms to convey an indication of the length or duration for a channel clearance procedure (e.g., such as an eCCA procedure) implemented at the receiving device. For example, a UE may receive a grant (e.g., a pre-grant (PG), such as a downlink control information (DCI) grant) from a base station scheduling a downlink transmission to the UE. The grant may also schedule an acknowledgment feedback transmission (e.g., such as an acknowledgment/negative-acknowledgment (ACK/NACK) transmission) for the UE to provide an indication confirming that the UE was able to successfully receive and decode the grant scheduling the downlink transmission. The UE may identify or otherwise determine a duration for the channel clearance procedure (e.g., an eCCA procedure) to be performed prior to the acknowledgment feedback transmission. For example, the UE may identify or otherwise determine the duration for the channel clearance procedure based on a first timing associated with the grant and/or based on a second timing associated with the acknowledgment feedback transmission. Accordingly, the UE may perform the channel clearance procedure for the duration and, if successful, transmit the acknowledgment feedback transmission to the base station. The downlink transmission may then be performed from the base station to the UE.

In some aspects, the duration for the channel clearance procedure may be based on the capability of the UE. For example, the base station may determine a processing time parameter for the UE, e.g., based on a UE capability message received from the UE. The base station may generate a random number that is used to define a minimum duration for the channel clearance procedure. The base station may use the random number, first timing associated with the grant, the second timing associated with the acknowledgment feedback transmission, and/or the processing time parameter of the UE when determining or otherwise identifying the duration for the channel clearance procedure. Accordingly, the base station may transmit the grant to the UE scheduling the acknowledgment feedback transmission and the downlink transmission to the UE, and then receive the acknowledgment feedback transmission based on the result of the channel clearance procedure performed by the UE. Assuming the acknowledgement feedback transmission is received at the base station, the downlink transmission may then be performed.

A method of wireless communication at a UE is described. The method may include receiving a grant scheduling an acknowledgement feedback transmission for the grant, identifying, based on a first timing associated with the grant, a second timing associated with the acknowledgment feedback transmission, or a combination thereof, a duration for a channel clearance procedure to be performed before transmitting the acknowledgement feedback transmission, performing the channel clearance procedure using the identified duration, and transmitting the acknowledgement feedback transmission based on a result of the channel clearance procedure.

An apparatus for wireless communication at a UE is described. The apparatus may include a processor, memory coupled with the processor, and instructions stored in the memory. The instructions may be executable by the processor to cause the apparatus to receive a grant scheduling an acknowledgement feedback transmission for the grant, identify, based on a first timing associated with the grant, a second timing associated with the acknowledgment feedback transmission, or a combination thereof, a duration for a channel clearance procedure to be performed before transmitting the acknowledgement feedback transmission, perform the channel clearance procedure using the identified duration, and transmit the acknowledgement feedback transmission based on a result of the channel clearance procedure.

Another apparatus for wireless communication at a UE is described. The apparatus may include means for receiving a grant scheduling an acknowledgement feedback transmission for the grant, identifying, based on a first timing associated with the grant, a second timing associated with the acknowledgment feedback transmission, or a combination thereof, a duration for a channel clearance procedure to be performed before transmitting the acknowledgement feedback transmission, performing the channel clearance procedure using the identified duration, and transmitting the acknowledgement feedback transmission based on a result of the channel clearance procedure.

A non-transitory computer-readable medium storing code for wireless communication at a UE is described. The code may include instructions executable by a processor to receive a grant scheduling an acknowledgement feedback transmission for the grant, identify, based on a first timing associated with the grant, a second timing associated with the acknowledgment feedback transmission, or a combination thereof, a duration for a channel clearance procedure to be performed before transmitting the acknowledgement feedback transmission, perform the channel clearance procedure using the identified duration, and transmit the acknowledgement feedback transmission based on a result of the channel clearance procedure.

Some examples of the method, apparatuses, and non-transitory computer-readable medium described herein may further include operations, features, means, or instructions for identifying a processing time parameter associated with the UE, where the duration of the channel clearance procedure may be further based on the processing time parameter.

Some examples of the method, apparatuses, and non-transitory computer-readable medium described herein may further include operations, features, means, or instructions for transmitting a UE capability message indicating the processing time parameter associated with the UE.

Some examples of the method, apparatuses, and non-transitory computer-readable medium described herein may further include operations, features, means, or instructions for receiving an indication of at least one of a start time, a stop time, or a combination thereof, for the channel clearance procedure, where the duration of the channel clearance procedure may be based on the indication.

In some examples of the method, apparatuses, and non-transitory computer-readable medium described herein, the grant or a downlink control information block associated with the grant.

In some examples of the method, apparatuses, and non-transitory computer-readable medium described herein, the grant may include operations, features, means, or instructions for ignoring one or more of the sequentially transmitted grants based on the received indication.

Some examples of the method, apparatuses, and non-transitory computer-readable medium described herein may further include operations, features, means, or instructions for ignoring one or more of the sequential acknowledgment feedback opportunities based on the received indication.

Some examples of the method, apparatuses, and non-transitory computer-readable medium described herein may further include operations, features, means, or instructions for identifying a resource configuration to be used for the acknowledgement feedback transmission, and determining the second timing associated with the acknowledgement feedback message based on the resource configuration.

In some examples of the method, apparatuses, and non-transitory computer-readable medium described herein, the first timing associated with the receive time of the grant includes at least one of a start time of the grant, or an end time of the grant, or a combination thereof.

A method of wireless communication at a base station is described. The method may include identifying a processing time parameter associated with a UE, identifying, based on a first timing associated with a grant, a second timing associated with an acknowledgment feedback transmission, the processing time parameter, or a combination thereof, a duration for a channel clearance procedure to be performed by the UE, transmitting the grant scheduling the acknowledgement feedback transmission for the grant, and receiving the acknowledgement feedback transmission based on a result of the channel clearance procedure performed by the UE.

An apparatus for wireless communication at a base station is described. The apparatus may include a processor, memory coupled with the processor, and instructions stored in the memory. The instructions may be executable by the processor to cause the apparatus to identify a processing time parameter associated with a UE, identify, based on a first timing associated with a grant, a second timing associated with an acknowledgment feedback transmission, the processing time parameter, or a combination thereof, a duration for a channel clearance procedure to be performed by the UE, transmit the grant scheduling the acknowledgement feedback transmission for the grant, and receive the acknowledgement feedback transmission based on a result of the channel clearance procedure performed by the UE.

Another apparatus for wireless communication at a base station is described. The apparatus may include means for identifying a processing time parameter associated with a UE, identifying, based on a first timing associated with a grant, a second timing associated with an acknowledgment feedback transmission, the processing time parameter, or a combination thereof, a duration for a channel clearance procedure to be performed by the UE, transmitting the grant scheduling the acknowledgement feedback transmission for the grant, and receiving the acknowledgement feedback transmission based on a result of the channel clearance procedure performed by the UE.

A non-transitory computer-readable medium storing code for wireless communication at a base station is described. The code may include instructions executable by a processor to identify a processing time parameter associated with a UE, identify, based on a first timing associated with a grant, a second timing associated with an acknowledgment feedback transmission, the processing time parameter, or a combination thereof, a duration for a channel clearance procedure to be performed by the UE, transmit the grant scheduling the acknowledgement feedback transmission for the grant, and receive the acknowledgement feedback transmission based on a result of the channel clearance procedure performed by the UE.

In some examples of the method, apparatuses, and non-transitory computer-readable medium described herein, identifying the duration for the channel clearance procedure may include operations, features, means, or instructions for generating a random number that defines a minimum duration for the channel clearance procedure, where the duration of the channel clearance procedure may be based on the minimum duration.

Some examples of the method, apparatuses, and non-transitory computer-readable medium described herein may further include operations, features, means, or instructions for selecting, based on the processing time parameter and the minimum duration, a grant transmission opportunity from a set of available grant transmission opportunities configured for the base station, where the first timing may be based on the selected grant transmission opportunity.

Some examples of the method, apparatuses, and non-transitory computer-readable medium described herein may further include operations, features, means, or instructions for selecting, based on the processing time parameter, the minimum duration, and the selected grant transmission opportunity, an acknowledgement feedback transmission opportunity from a set of available acknowledgement feedback transmission opportunities configured for the UE, where the second timing may be based on the selected acknowledgement transmission opportunity.

Some examples of the method, apparatuses, and non-transitory computer-readable medium described herein may further include operations, features, means, or instructions for receiving a UE capability message indicating the processing time parameter associated with the UE.

Some examples of the method, apparatuses, and non-transitory computer-readable medium described herein may further include operations, features, means, or instructions for transmitting an indication of at least one of a start time, a stop time, or a combination thereof, for the channel clearance procedure, where the duration of the channel clearance procedure may be based on the indication.

In some examples of the method, apparatuses, and non-transitory computer-readable medium described herein, the grant or a downlink control information block associated with the grant.

In some examples of the method, apparatuses, and non-transitory computer-readable medium described herein, the grant includes one of a set of sequentially transmitted grants.

In some examples of the method, apparatuses, and non-transitory computer-readable medium described herein, the acknowledgement feedback transmission occurs at an acknowledgment feedback opportunity in a set of sequential acknowledgment feedback opportunities.

Some examples of the method, apparatuses, and non-transitory computer-readable medium described herein may further include operations, features, means, or instructions for identifying a resource configuration to be used for the acknowledgement feedback reception, and determining the second timing associated with the acknowledgement feedback message based on the resource configuration.

In some examples of the method, apparatuses, and non-transitory computer-readable medium described herein, the first timing associated with the grant includes at least one of a start time of the grant, or an end time of the grant, or a combination thereof.

DETAILED DESCRIPTION

Figure 1:
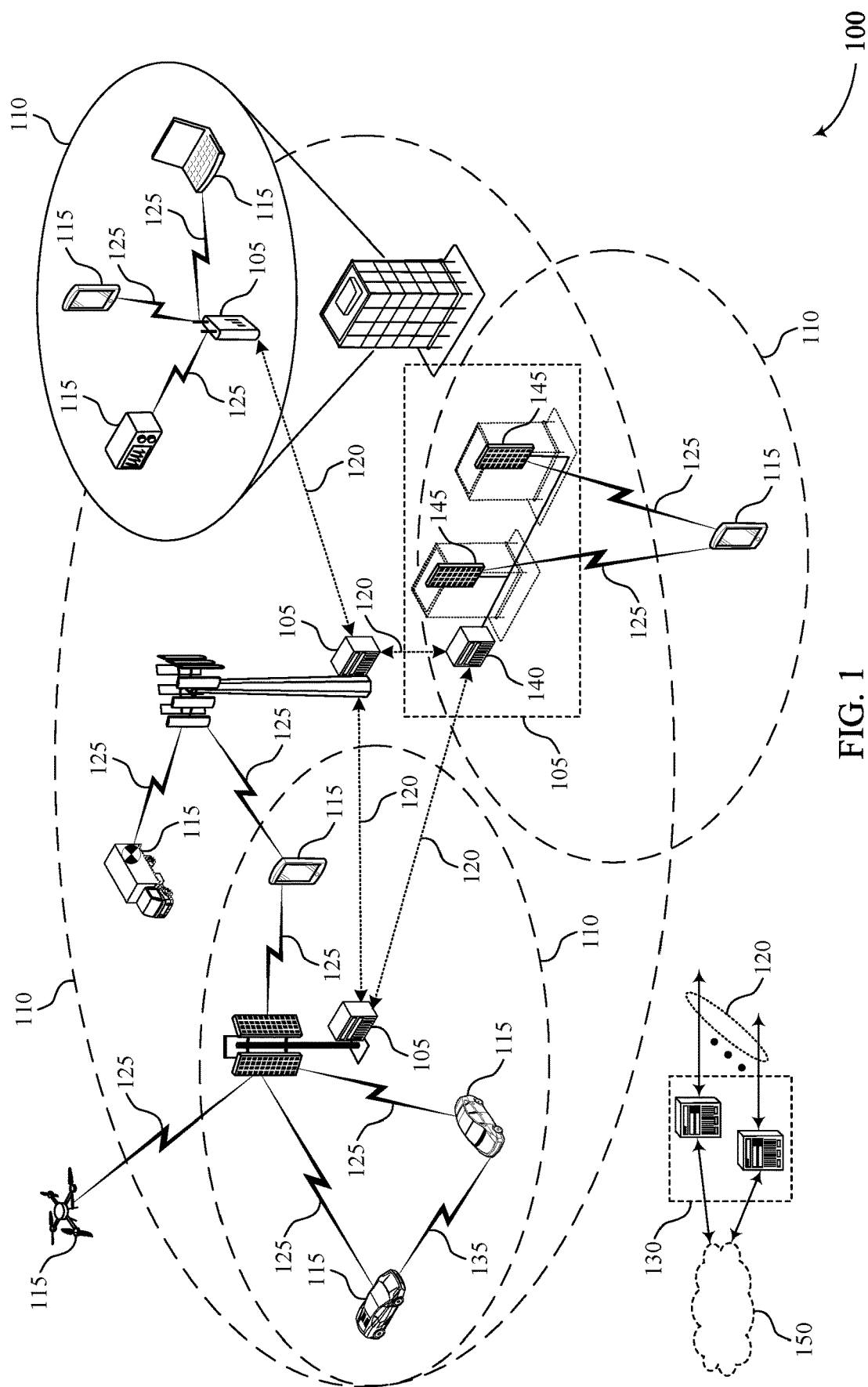
FIG. 1 illustrates an example of a system for wireless communications that supports user equipment (UE) side enhanced clear channel assessment (eCCA) length indication in accordance with aspects of the present disclosure.

Wireless communication systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the user equipment (UE) may be beamformed. Moreover, a receiving device may use beamforming techniques to configure antenna(s) and/or antenna array(s) such that transmissions are received in a directional manner.

For a mmW link, the transmitting device and a receiving device may experience very different interference/channel performance environments. Accordingly, some wireless communication systems are configured such that the receiving device (e.g., a UE) is afforded more protection than the transmitting device (e.g., a base station). In some aspects, affording the receiving device more protection may include the receiving device implementing a channel clearance procedure (e.g., such as an enhanced clear channel assessment (eCCA) procedure) prior to transmitting an acknowledgment feedback transmission to the base station. Focusing the channel clearance procedure design (e.g., the listen-before-talk (LBT) design) can avoid unnecessary backoffs at the base station while still protecting the receiving device. In some designs, the duration or length of the channel clearance procedure (e.g., the eCCA procedure) may be explicitly indicated to the UE by the base station. However, this approach increases overhead with respect to the information being exchanged.

Aspects of the disclosure are initially described in the context of wireless communication systems. Generally, the described techniques provide various mechanisms that support wireless communications in a wireless network. Broadly, aspects of the described techniques support various mechanisms to convey an indication of the length or duration for a channel clearance procedure (e.g., such as an eCCA procedure) implemented at the receiving device. For example, a UE may receive a grant (e.g., a pre-grant (PG), such as a downlink control information (DCI) grant) from a base station scheduling a downlink transmission to the UE. The grant may also schedule an acknowledgment feedback transmission (e.g., such as an acknowledgment/negative-acknowledgment (ACK/NACK) transmission) for the UE to provide an indication confirming that the UE was able to successfully receive and decode the grant scheduling the downlink transmission. The UE may identify or otherwise determine a duration for the channel clearance procedure (e.g., an eCCA procedure) to be performed prior to the acknowledgment feedback transmission. For example, the UE may identify or otherwise determine the duration for the channel clearance procedure based on a first timing associated with the grant and/or based on a second timing associated with the acknowledgment feedback transmission. Accordingly, the UE may perform the channel clearance procedure for the duration and, if successful, transmit the acknowledgment feedback transmission to the base station. The downlink transmission may then be performed from the base station to the UE.

In some aspects, the duration for the channel clearance procedure may be based on the capability of the UE. For example, the base station may determine a processing time parameter for the UE, e.g., based on a UE capability message received from the UE. The base station may generate a random number that is used to define a minimum duration for the channel clearance procedure. The base station may use the random number, first timing associated with the grant, the second timing associated with the acknowledgment feedback transmission, and/or the processing time parameter of the UE when determining or otherwise identifying the duration for the channel clearance procedure. Accordingly, the base station may transmit the grant to the UE scheduling the acknowledgment feedback transmission and the downlink transmission to the UE, and then receive the acknowledgment feedback transmission based on the result of the channel clearance procedure performed by the UE. Assuming the acknowledgement feedback transmission is received at the base station, the downlink transmission may then be performed.

Aspects of the disclosure are further illustrated by and described with reference to apparatus diagrams, system diagrams, and flowcharts that relate to UE side eCCA length indication.

FIG. 1 illustrates an example of a wireless communication system 100 that supports UE side eCCA length indication in accordance with aspects of the present disclosure. The wireless communication system 100 may include one or more base stations 105, one or more UEs 115, and a core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communication system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive a grant scheduling an acknowledgement feedback transmission for the grant. The UE 115 may identify, based at least in part on a first timing associated with the grant, a second timing associated with the acknowledgment feedback transmission, or a combination thereof, a duration for a channel clearance procedure to be performed before transmitting the acknowledgement feedback transmission. The UE 115 may perform the channel clearance procedure using the identified duration. The UE 115 may transmit the acknowledgement feedback transmission based at least in part on a result of the channel clearance procedure.

A base station 105 may identifying a processing time parameter associated with a UE 115. The base station 105 may identify, based at least in part on a first timing associated with a grant, a second timing associated with an acknowledgment feedback transmission, the processing time parameter, or a combination thereof, a duration for a channel clearance procedure to be performed by the UE 115 before the UE 115 transmits the acknowledgement feedback transmission. The base station 105 may transmit the grant scheduling the acknowledgement feedback transmission for the grant. The base station 105 may receive the acknowledgement feedback transmission based at least in part on a result of the channel clearance procedure performed by the UE 115.

Figure 2:
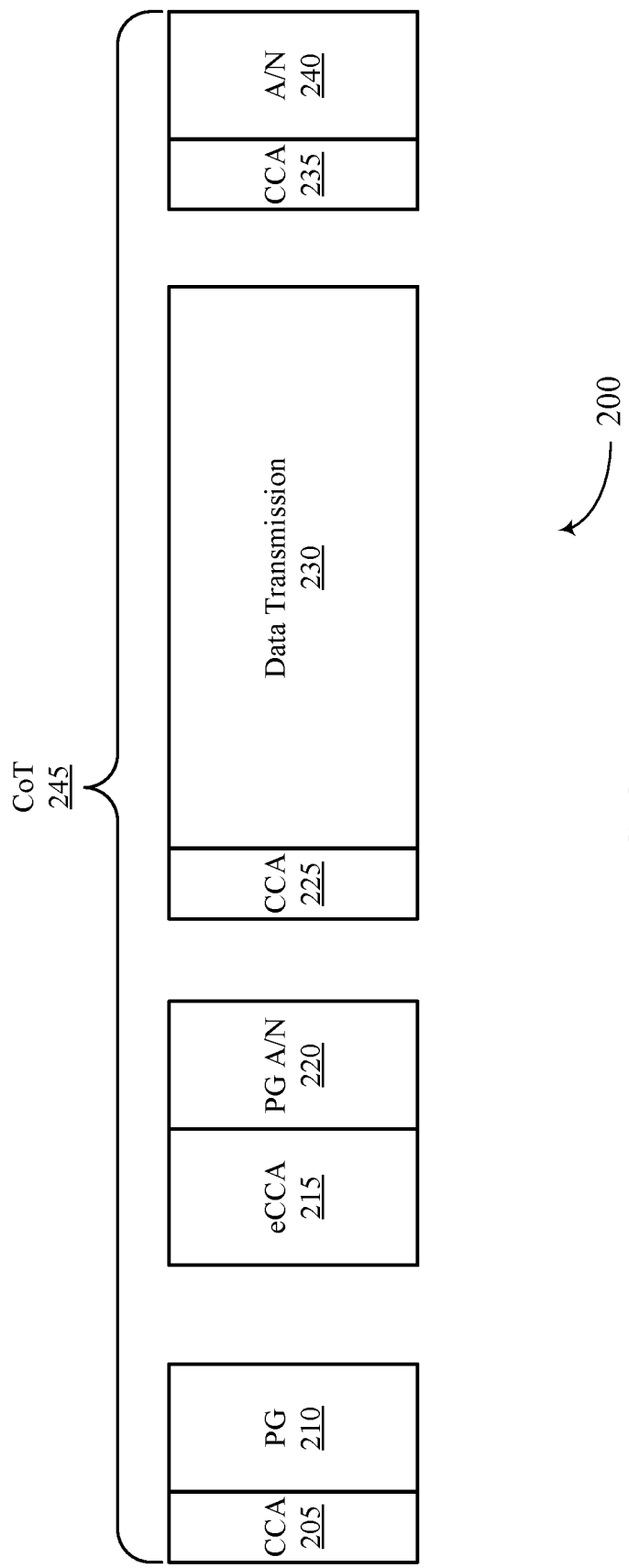
FIG. 2 illustrates an example of a channel occupancy time (CoT) configuration that supports UE side eCCA length indication in accordance with aspects of the present disclosure.

FIG. 2 illustrates an example of a CoT configuration 200 that supports UE side eCCA length indication in accordance with aspects of the present disclosure. In some examples, CoT configuration 200 may implement aspects of wireless communication system 100. CoT configuration 200 may be implemented by a UE and/or base station, which may be examples of the corresponding devices described herein.

For a mmW link, the base station and UE may experience very different interference/channel performance environments. Accordingly, some wireless communication systems are configured such that the receiving device (e.g., the UE) is afforded more protection than the transmitting device (e.g., the base station). In some aspects, affording the receiving device more protection may include the receiving device implementing a channel clearance procedure (e.g., such as an eCCA procedure) prior to transmitting an acknowledgment feedback transmission to the base station. Focusing the channel clearance procedure design (e.g., the LBT design) can avoid unnecessary backoffs at the base station while still protecting the receiving device. In some designs, the duration or length of the channel clearance procedure (e.g., the eCCA procedure) may be explicitly indicated to the UE by the base station. However, this approach increases overhead with respect to the information being exchanged.

For example, the base station may perform a CCA procedure 205 (e.g., a one-shot LBT procedure, CAT-2 LBT procedure, and the like) prior to transmitting a grant 210 (e.g., a pre-grant (PG) to the UE, which may be a PDCCH DCI grant). The grant 210 may schedule an acknowledgment feedback transmission 220 and data transmission 230 for the UE. Accordingly, the UE may perform an eCCA procedure 215 (e.g., a full or CAT-4 LBT procedure) prior to transmitting the acknowledgment feedback transmission 220 to the base station. In some aspects, the acknowledgment feedback transmission 220 may be an ACK/NACK feedback transmission for the grant 210, e.g., confirming that the UE was able to receive and decode the grant 210. Based on receiving the acknowledgment feedback transmission 220, the base station may perform a CCA procedure 225 (e.g., a one-shot LBT procedure) prior to performing the data transmission 230 to the UE. Subsequently, the UE may perform a CCA procedure 235 (e.g., a one-shot LBT procedure) prior to performing a second acknowledgment feedback transmission 240 indicating whether the UE was able to successfully receive and decode the data transmission 230.

In some wireless communication systems, the length or duration of the eCCA procedure 215 implemented at the receiving device may be indicated by the base station in the grant 210. For example, the base station may identify a random number using a random number generator to use in identifying or otherwise determining the duration of the eCCA procedure 215. The base station may know how long the gap is between the grant 210 transmission and the acknowledgment feedback transmission 220 transmission, and can schedule the UE for transmitting the acknowledgment feedback transmission 220 at the right time (e.g., may leave enough time). However, there is a connection or link between the grant 210 and the eCCA procedure 215 length or duration. Thus, some wireless communication systems may be configured such that the base station may indicate the acknowledgment feedback transmission 220 start time, which may be provided far enough in advance so that the gap between the grant 210 transmission and the acknowledgment feedback transmission 220 can cover (e.g., span) the processing delay of the UE in addition to the eCCA procedure 215 duration. In some examples, the base station may separately indicate the number of CCA slots for the eCCA procedure 215 duration. The base station requesting the UE to perform more CCA (e.g., a longer eCCA procedure 215) than is typically performed based on the random number may be compliant with the applicable regulations. As discussed though, this technique requires the base station to identify, encode, modulate, and transmit even more information to the UE. This approach increases the overhead between the base station and UE and/or the indication may be missed by the UE, which disrupts communications between the base station and UE.

Accordingly, aspects of the described techniques provide various mechanisms to implicitly indicate or otherwise identify the duration for the eCCA procedure 215 (e.g., a channel clearance procedure using the identified duration). That is, aspects of the described techniques may provide for the number of CCA slots for the eCCA procedure 215 to be implied by the transmission timing for the grant 210 and/or the acknowledgment feedback transmission 220.

For example, the UE may transmit a UE capability message to the base station that carries or otherwise conveys an indication of a processing time parameter (e.g., the processing delay) of the UE. Broadly, the processing time parameter may convey an indication of the amount of time that the UE needs in order to receive the grant 210, decode the grant 210, determine the duration of the eCCA procedure 215, and be ready to start the eCCA procedure 215 (e.g., transition from a transmit mode to a receive mode). For example, a legacy UE may have a longer processing time parameter than an advanced or next-generation UE.

The base station may identify the processing time parameter for the UE based on the UE capability message. Accordingly, the base station may identify or otherwise determine a duration for the eCCA procedure 215 (e.g., the channel clearance procedure) based on the transmission timing for the grant 210 (e.g., a first timing associated with the grant 210), on the transmission timing associated with the acknowledgment feedback transmission 220 (e.g., a second timing associated with the acknowledgment feedback transmission 220), and/or the processing time parameter of the UE. Broadly, the transmission timing may refer to the beginning of the transmission, the end of the transmission, and/or some point within or during the transmission. Similarly, the transmission timing may refer to the beginning of the reception of a transmission, the end of the reception of a transmission, and/or some point within or during the reception of a transmission. The base station may also utilize the random number generator to generate a random number that is considered when identifying or otherwise determining the duration of the eCCA procedure 215, e.g., to add additional to minimal time to the duration of the eCCA procedure 215.

In some aspects, the transmission timing for the acknowledgment feedback transmission 220 (e.g., the second timing) may be based on a next available opportunity for the UE to perform the acknowledgment feedback transmission 220. For example, certain resources and/or timing configurations may be configured for acknowledgment feedback transmissions from the UE and/or other UEs. The base station identifying the duration of the eCCA procedure 215 may include the base station adding the processing time parameter of the UE with the random number, and then adding any additional time based on when the next available opportunity is for the UE to perform the acknowledgment feedback transmission 220. For example, the acknowledgement feedback transmission 220 may be via a PUCCH waveform, with the next available resource depending on the PUCCH resource set configuration.

Accordingly, the base station may perform the CCA procedure 205 (e.g., a one-shot LBT procedure) and, if successful, transmit the grant 210 to the UE to schedule the downlink transmission 230 and the acknowledgment feedback transmission 220. The UE may receive the grant 210 and identify or otherwise determine the duration for the eCCA procedure 215 (e.g., the channel clearance procedure to be performed by the UE before transmitting the acknowledgment feedback transmission 220).

In some aspects, the UE may identify or otherwise determine the duration for the eCCA procedure 215 based on the transmission timing of the grant 210 and/or the acknowledgment feedback transmission 220. For example, the UE may know its own processing time and know when the next available opportunity is to perform the acknowledgment feedback transmission 220, e.g., based on the PUCCH resource set configuration. The UE may assume a default or minimum random number used by the base station for determining the duration of the eCCA procedure 215. Accordingly, the UE may add its processing time to the random number and, if any, the time until the next available acknowledgment feedback transmission 220 opportunity. This time may provide or otherwise convey an indication of the duration of the eCCA procedure 215.

Accordingly, the UE may perform the eCCA procedure 215 (e.g., the channel clearance procedure) using the identified duration. If the eCCA procedure 215 is successful (e.g., based on energy detected on the channel and/or wireless transmissions detected on the channel being below a threshold), the UE may transmit the acknowledgment feedback transmission 220 to the base station. As discussed, the acknowledgment feedback transmission 220 generally conveys an indication of whether or not the UE was able to successfully receive and decode the grant 210.

Based on receiving the acknowledgment feedback transmission 220, the base station may perform CCA procedure 225 (e.g., a one-shot CCA/LBT procedure) and, if successful, transmit the data transmission 230 to the UE. The UE may then perform the CCA procedure 235 (e.g., a one-shot CCA/LBT procedure) and, if successful, transmit a second acknowledgment feedback transmission 240 to the base station confirming that the UE was able to receive and decode the data transmission 230. The transmissions of the grant 210, acknowledgement feedback transmission 220, data transmission 230 and second acknowledgement feedback transmission 240 may occur within a CoT 245.

Accordingly, aspects the described techniques may include the base station knowing the UE capability (e.g., the processing time) reported in the UE capability message (e.g., "X" indicated using an N2 capability or some newly defined indication). Accordingly, the base station may know the timing from the end of the signal carrying the PDCCH for the grant 210 to the time the UE can start to perform the eCCA procedure 215. The base station picks the random number, but the random number may not be explicitly carried in the grant 210 (e.g., to save the DCI payload size). The base station will schedule the acknowledgment feedback transmission 220 time offset (e.g., relative to the grant 210) later or after the UE processing time and random number. Due to the resource limitation (e.g., when the acknowledgment feedback transmission 220 is a PUCCH waveform, so the next available resource depends on the PUCCH resource set configuration), the acknowledgment feedback transmission 220 timing may not be exactly at the end of the UE processing time plus the random number, e.g., may be later. The UE will detect the grant 210 and parse the acknowledgment feedback transmission 220 transmission time, which may indicate the time before the acknowledgment feedback transmission 220, but may be X after the last symbol of the grant 210 as the implicitly indicated eCCA window or duration.

Figure 3:
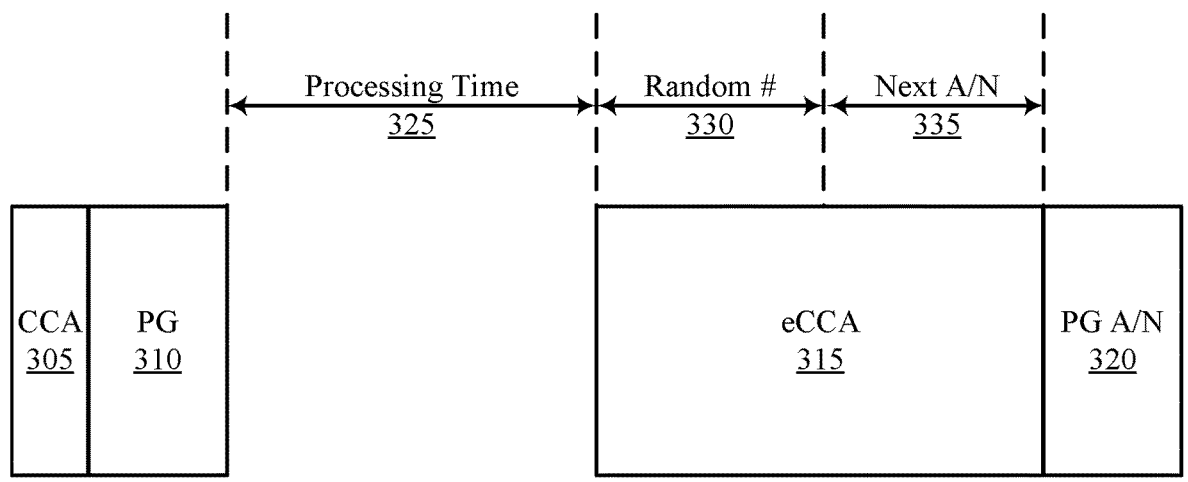
FIG. 3 illustrates an example of a CoT configuration that supports UE side eCCA length indication in accordance with aspects of the present disclosure.

FIG. 3 illustrates an example of a CoT configuration 300 that supports UE side eCCA length indication in accordance with aspects of the present disclosure. In some examples, CoT configuration 300 may implement aspects of wireless communication systems 100 and/or CoT configuration 200. CoT configuration 300 may be implemented by a UE and/or base station, which may be examples of the corresponding devices described herein.

As discussed above, aspects of the described techniques provide various mechanisms to implicitly indicate or otherwise identify the duration for the eCCA procedure 315 (e.g., a channel clearance procedure using the identified duration). That is, aspects of the described techniques may provide for the number of CCA slots for the eCCA procedure 315 to be implied by the transmission timing for the grant 310 and/or the acknowledgment feedback transmission 320.

For example, the UE may transmit a UE capability message to the base station that carries or otherwise conveys an indication of a processing time parameter 325 (e.g., the processing delay) of the UE. Broadly, the processing time parameter 325 may convey an indication of the amount of time that the UE needs in order to receive the grant 310, decode the grant 310, determine the duration of the eCCA procedure 315, and be ready to start the eCCA procedure 315 (e.g., transition from a transmit mode to a receive mode). For example, a legacy UE may have a longer processing time parameter than an advanced or next-generation UE.

The base station may identify the processing time parameter for the UE based on the UE capability message. Accordingly, the base station may identify or otherwise determine a duration for the eCCA procedure 315 (e.g., the channel clearance procedure) based on the transmission timing for the grant 310 (e.g., a first timing associated with the grant 310), on the transmission timing associated with the acknowledgment feedback transmission 320 (e.g., a second timing associated with the acknowledgment feedback transmission 320), and/or the processing time parameter 325 of the UE. Broadly, the transmission timing may refer to the beginning of the transmission, the end of the transmission, and/or some point within or during the transmission. Similarly, the transmission timing may refer to the beginning of the reception of a transmission, the end of the reception of a transmission, and/or some point within or during the reception of a transmission. The base station may also utilize the random number generator to generate a random number 330 that is considered when identifying or otherwise determining the duration of the eCCA procedure 315, e.g., to add additional or minimal time to the duration of the eCCA procedure 315.

In some aspects, the transmission timing for the acknowledgment feedback transmission 320 (e.g., the second timing) may be based on a next available opportunity 335 for the UE to perform the acknowledgment feedback transmission 320. For example, certain resources and/or timing configurations may be configured for acknowledgment feedback transmissions from the UE and/or other UEs. The base station identifying the duration of the eCCA procedure 315 may include the base station adding the processing time parameter 325 of the UE with the random number 330, and then adding any additional time based on when the next available opportunity 335 is for the UE to perform the acknowledgment feedback transmission 320. For example, the acknowledgement feedback transmission 320 may be via a PUCCH waveform, with the next available resource depending on the PUCCH resource set configuration.

Accordingly, the base station may perform the CCA procedure 305 (e.g., a one-shot LBT procedure) and, if successful, transmit the grant 310 to the UE to schedule a downlink transmission and the acknowledgment feedback transmission 320. The UE may receive the grant 310 and identify or otherwise determine the duration for the eCCA procedure 315 (e.g., the channel clearance procedure to be performed by the UE before transmitting the acknowledgment feedback transmission 320).

In some aspects, the UE may identify or otherwise determine the duration for the eCCA procedure 315 based on the transmission timing of the grant 310 and/or the acknowledgment feedback transmission 320. For example, the UE may know its own processing time 325 and know when the next available opportunity 335 is to perform the acknowledgment feedback transmission 320, e.g., based on the PUCCH resource set configuration. The UE may assume a default or minimum random number 330 used by the base station for determining the duration of the eCCA procedure 315. Accordingly, the UE may add its processing time 325 to the random number 330 and, if any, the time until the next available opportunity 335 for the acknowledgment feedback transmission 320. This time may provide or otherwise convey an indication of the duration of the eCCA procedure 315.

Accordingly, the UE may perform the eCCA procedure 315 (e.g., the channel clearance procedure) using the identified duration. If the eCCA procedure 315 is successful (e.g., based on energy detected on the channel and/or wireless transmissions detected on the channel being below a threshold), the UE may transmit the acknowledgment feedback transmission 320 to the base station. As discussed, the acknowledgment feedback transmission 320 generally conveys an indication of whether or not the UE was able to successfully receive and decode the grant 310.

Based on receiving the acknowledgment feedback transmission 320, the base station may perform a one-shot CCA procedure and, if successful, transmit the data transmission to the UE. The UE may then perform a one-shot CCA procedure and, if successful, transmit a second acknowledgment feedback transmission to the base station confirming that the UE was able to receive and decode the data transmission.

Figure 4:
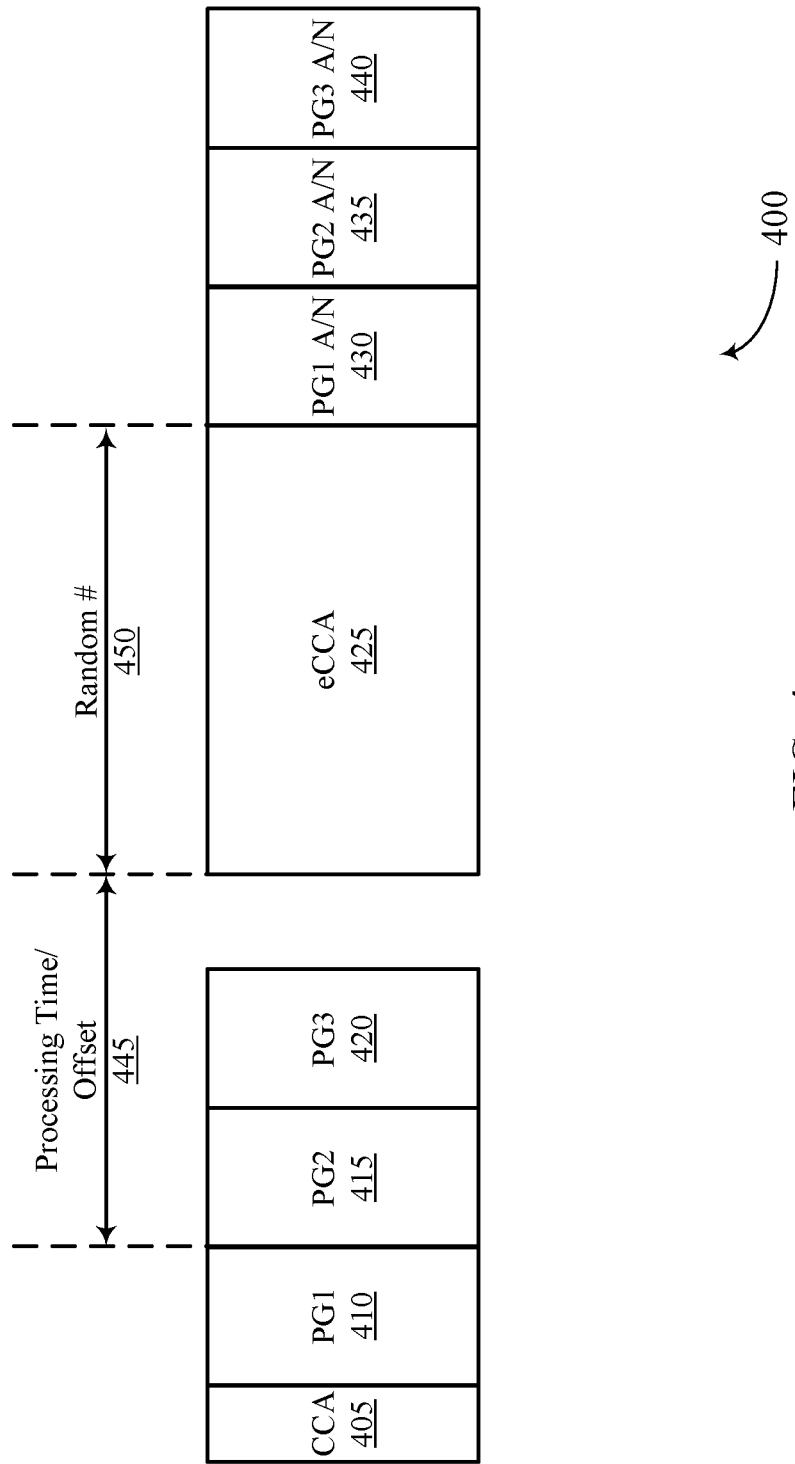
FIG. 4 illustrates an example of a CoT configuration that supports UE side eCCA length indication in accordance with aspects of the present disclosure.

FIG. 4 illustrates an example of a CoT configuration 400 that supports UE side eCCA length indication in accordance with aspects of the present disclosure. In some examples, CoT configuration 400 may implement aspects of wireless communication system 100 and/or CoT configurations 200 and/or 300. CoT configuration 400 may be implemented by a UE and/or base station, which may be examples of the corresponding devices described herein.

As discussed above, aspects of the described techniques provide various mechanisms to implicitly indicate or otherwise identify the duration for the eCCA procedure (e.g., a channel clearance procedure using the identified duration). That is, aspects of the described techniques may provide for the number of CCA slots for the eCCA procedure to be implied by the transmission timing for the grant and/or the acknowledgment feedback transmission.

CoT configuration 400 illustrates an example where the transmissions of multiple grants are TDM and/or transmitted in different beams to the same UE or to different UEs. For example, the base station may transmit a first grant 410, a second grant 415, and a third grant 420 to the UE(s) using a first transmit beam, a second transmit beam, and a third transmit beam, respectively, at the same time or consecutively. Additionally or alternatively, the base station may transmit the first grant 410, the second grant 415, and the third grant 420 to the UE(s) using the same transmit beam, but consecutively.

More particularly, the base station may perform a CCA procedure 405 (e.g., a one-shot CCA procedure) before transmitting the first grant 410 (e.g., a first pre-grant or PG1), the second grant 415 (e.g., a second pre-grant or PG2), and the third grant 420 (e.g., a third pre-grant or PG3) to the UE(s). In some aspects, each of the grants 410, 415, and/or 420 may schedule data transmission(s) for the UE(s) and also schedule acknowledgement feedback transmissions for the grants 410, 415, and/or 420. For example, the first grant 410 may schedule a first acknowledgement feedback transmission 430 (e.g., ACK/NACK transmission for the first grant 410), the second grant 415 may schedule a second acknowledgement feedback transmission 435, and the third grant 420 may schedule a third acknowledgement transmission 440. In some aspects, the first grant 410, second grant 415, and/or third grant 420 may carry or otherwise convey an indication of a start and/or stop/end time for the eCCA procedure 425 to be performed by the UE(s).

For example, the UE(s) may transmit UE capability message(s) to the base station that carries or otherwise conveys an indication of a processing time/offset parameter 445 (e.g., the processing delay) of the UE(s). Broadly, the processing time/offset parameter 445 may convey an indication of the amount of time that the UE(s) need(s) in order to receive the grant, decode the grant, determine the duration of the eCCA procedure 425, and be ready to start the eCCA procedure 425 (e.g., transition from a transmit mode to a receive mode). For example, a legacy UE may have a longer processing time parameter than an advanced or next-generation UE.

The base station may identify the processing time/offset parameter 445 for the UE(s) based on the UE capability message(s). Accordingly, the base station may identify or otherwise determine a duration for the eCCA procedure 445 (e.g., the channel clearance procedure) based on the transmission timing for the first grant 410 in this example (e.g., a first timing associated with the first grant 410), on the transmission timing associated with the first acknowledgment feedback transmission 430 continuing with this example (e.g., a second timing associated with the acknowledgment feedback transmission 430), and/or the processing time/offset parameter 445 of the UE(s). Broadly, the transmission timing may refer to the beginning of the transmission, the end of the transmission, and/or some point within or during the transmission. Similarly, the transmission timing may refer to the beginning of the reception of a transmission, the end of the reception of a transmission, and/or some point within or during the reception of a transmission. The base station may also utilize the random number generator to generate a random number 450 that is considered when identifying or otherwise determining the duration of the eCCA procedure 425, e.g., to add additional or minimal time to the duration of the eCCA procedure 425. In the situation where the grants illustrated in CoT configuration 400 are for different UEs, the base station may identify the durations for each eCCA procedure to be performed by the UEs based on their respective UE capabilities. In the situation here the grants illustrated in CoT configuration 400 are for the same UE, the duration for the eCCA procedure 425 may be based on that UE's capability.

In some aspects, the transmission timing for the first acknowledgment feedback transmission 430 (e.g., the second timing) may be based on a next available opportunity for the UE to perform the acknowledgment feedback transmission 430. For example, certain resources and/or timing configurations may be configured for acknowledgment feedback transmissions from the UE and/or other UEs. The base station identifying the duration of the eCCA procedure 425 may include the base station adding the processing time/offset parameter 445 of the UE with the random number 450, and then adding any additional time based on when the next available opportunity is for the UE to perform the first acknowledgment feedback transmission 430. For example, the first acknowledgement feedback transmission 430 may be via a PUCCH waveform, with the next available resource depending on the PUCCH resource set configuration.

Accordingly, the base station may perform the CCA procedure 405 (e.g., a one-shot LBT procedure) and, if successful, transmit the first grant 410, the second grant 415, and the third grant 420 to the UE(s) to schedule corresponding downlink transmissions and the corresponding acknowledgment feedback transmissions. The UE(s) may receive the grant 410 and identify or otherwise determine the duration for the eCCA procedure 425 (e.g., the channel clearance procedure to be performed by the UE before transmitting the first acknowledgment feedback transmission 430). In some aspects, the base station may configure the first grant 410, the second grant 415, and/or the third grant 420 may be configured to carry or otherwise convey indications of the start and/or stop time for their respective eCCA procedures. For example, indicating the start time in the grant may enable the UE(s) to skip the other grants. In some aspects, this start time may be included in the processing time/offset parameter 445.

In some aspects, the UE may identify or otherwise determine the duration for the eCCA procedure 425 based on the transmission timing of the corresponding grant and/or the acknowledgment feedback transmission. For example, the UE may know its own processing time and know when the next available opportunity is to perform the first acknowledgment feedback transmission 430, e.g., based on the PUCCH resource set configuration. The UE may assume a default or minimum random number 450 used by the base station for determining the duration of the eCCA procedure 425. Accordingly, the UE may add its processing time to the random number 450 and, if any, the time until the next available opportunity for the first acknowledgment feedback transmission 430. This time may provide or otherwise convey an indication of the duration of the eCCA procedure 425.

Accordingly, the UE may perform the eCCA procedure 425 (e.g., the channel clearance procedure) using the identified duration. If the eCCA procedure 425 is successful (e.g., based on energy detected on the channel and/or wireless transmissions detected on the channel being below a threshold), the UE may transmit the first acknowledgment feedback transmission 430 to the base station. As discussed, the acknowledgment feedback transmission 430 generally conveys an indication of whether or not the UE was able to successfully receive and decode the first grant 410. In the situation where the first grant 410, the second grant 415, and the third grant 420 are for the same UE, eCCA procedure 425 may be performed before transmitting the first acknowledgement transmission 430 responsive to the first grant 410, the second acknowledgement transmission 435 responsive to the second grant 415, and the third acknowledgement transmission 440 responsive to the third grant 420. In the situation where the first grant 410, the second grant 415, and the third grant 420 are for the different UEs, eCCA procedure 425 may be performed by the first UE before transmitting the first acknowledgement transmission 430 responsive to the first grant 410. In this situation, each of the other UEs may implement the described techniques to determine the duration for their respective eCCA procedures before transmitting the second acknowledgement transmission 435 responsive to the second grant 415, the third acknowledgement transmission 440 responsive to the third grant 420, and so forth.

Based on receiving the acknowledgment feedback transmission(s), the base station may perform a one-shot CCA procedure and, if successful, transmit the data transmission(s) to the UE(s). The UE(s) may then perform a one-shot CCA procedure and, if successful, transmit corresponding second acknowledgment feedback transmission(s) to the base station confirming that the UE(s) was/were able to receive and decode the data transmission(s).

Figure 5:
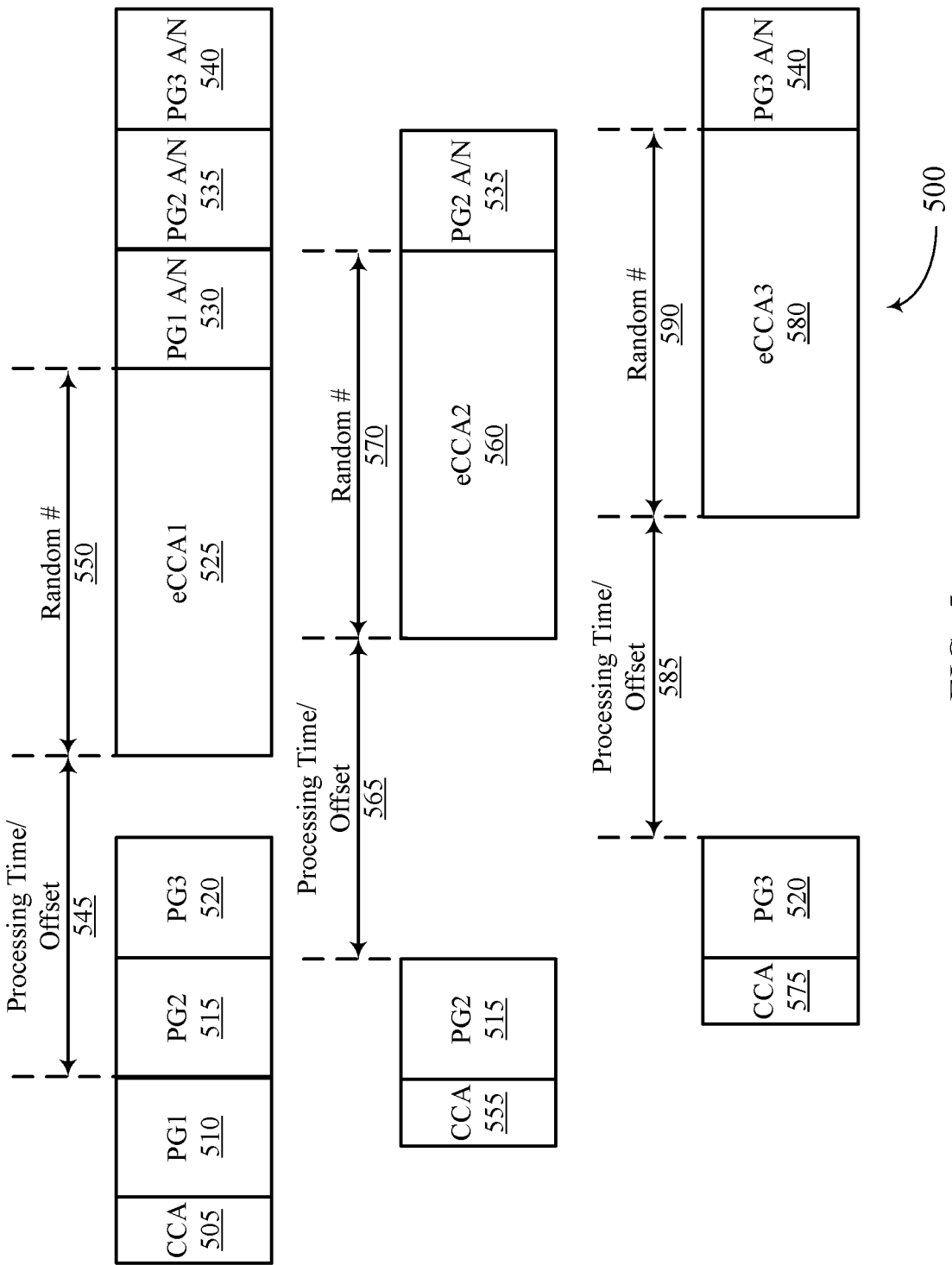
FIG. 5 illustrates an example of a CoT configuration that supports UE side eCCA length indication in accordance with aspects of the present disclosure.

FIG. 5 illustrates an example of a CoT configuration 500 that supports UE side eCCA length indication in accordance with aspects of the present disclosure. In some examples, CoT configuration 500 may implement aspects of wireless communication system 100 and/or CoT configurations 200, 300, and/or 400. CoT configuration 500 may be implemented by a UE and/or base station, which may be examples of the corresponding devices described herein.

As discussed above, aspects of the described techniques provide various mechanisms to implicitly indicate or otherwise identify the duration for the eCCA procedure (e.g., a channel clearance procedure using the identified duration). That is, aspects of the described techniques may provide for the number of CCA slots for the eCCA procedure to be implied by the transmission timing for the grant and/or the acknowledgment feedback transmission.

CoT configuration 500 illustrates an example where the transmissions of multiple grants are TDM and/or transmitted in different transmit beams to the same UE or to different UEs. For example, the base station may transmit a first grant 510, a second grant 515, and a third grant 520 to the UE(s) using a first transmit beam, a second transmit beam, and a third transmit beam, respectively, at the same time or consecutively. Additionally or alternatively, the base station may transmit the first grant 510, the second grant 515, and the third grant 520 to the UE(s) using the same transmit beam, but consecutively.

More particularly, the base station may perform a CCA procedure 505 (e.g., a one-shot CCA procedure) before transmitting the first grant 510 (e.g., a first pre-grant or PG1). The first grant 510 may schedule a downlink transmission and a first acknowledgment feedback transmission 530. The base station may perform a CCA procedure 555 (e.g., a one-shot CCA procedure) before transmitting the second grant 515 (e.g., a second pre-grant or PG2). The second grant 515 may schedule a downlink transmission and a second acknowledgment feedback transmission 535. The base station may perform a CCA procedure 575 (e.g., a one-shot CCA procedure) before transmitting the third grant 520 (e.g., a third pre-grant or PG3). The third grant 520 may schedule a downlink transmission and a third acknowledgment feedback transmission 540. In some aspects, the first grant 510, second grant 515, and/or third grant 520 may carry or otherwise convey an indication of a start and/or stop/end time for the eCCA procedures to be performed by the UE(s).

For example, the UE(s) may transmit UE capability message(s) to the base station that carries or otherwise conveys an indication of a processing time/offset parameter (e.g., the processing delay) of the UE(s). Broadly, the processing time/offset parameter may convey an indication of the amount of time that the UE(s) need(s) in order to receive the grant, decode the grant, determine the duration of the eCCA procedure, and be ready to start the eCCA procedure (e.g., transition from a transmit mode to a receive mode). For example, a legacy UE may have a longer processing time parameter than an advanced or next-generation UE.

For example, the base station may identify the processing time/offset parameters 545, 565, and 585 for the UE(s) based on the respective UE capability message(s). Accordingly, the base station may identify or otherwise determine a duration for the eCCA procedure (e.g., the channel clearance procedure) based on the transmission timing for the grant (e.g., a first timing associated with the grant), on the transmission timing associated with the corresponding acknowledgment feedback transmission (e.g., a second timing associated with the acknowledgment feedback transmission), and/or the processing time/offset parameter(s) of the UE(s).

More particularly, the base station may identify or otherwise determine a duration for the eCCA procedure 525 based on the transmission timing for the first grant 510, the transmission timing associated with the first acknowledgement feedback transmission 530, and the processing time/offset parameter 545. Similarly, the base station may identify or otherwise determine a duration for the eCCA procedure 560 based on the transmission timing for the second grant 515, the transmission timing associated with the second acknowledgement feedback transmission 535, and the processing time/offset parameter 565. Lastly, the base station may identify or otherwise determine a duration for the eCCA procedure 580 based on the transmission timing for the third grant 520, the transmission timing associated with the third acknowledgement transmission 540, and the processing time/offset parameter 585.

Broadly, the transmission timing may refer to the beginning of the transmission, the end of the transmission, and/or some point within or during the transmission. Similarly, the transmission timing may refer to the beginning of the reception of a transmission, the end of the reception of a transmission, and/or some point within or during the reception of a transmission.

The base station may also utilize the random number generator to generate a random number 550 that is considered when identifying or otherwise determining the duration of the eCCA procedure 525, to generate a random number 570 that is considered when identifying or otherwise determining the duration of the eCCA procedure 560, and to generate a random number 590 that is considered when identifying or otherwise determining the duration of the eCCA procedure 580. In the situation where the grants illustrated in CoT configuration 500 are for different UEs, the base station may identify the durations for each eCCA procedure to be performed by the UEs based on their respective UE capabilities. In the situation here the grants illustrated in CoT configuration 500 are for the same UE, the duration for the eCCA procedures may be based on that UE's capability.

In some aspects, the transmission timing for the acknowledgment feedback transmissions (e.g., the second timing) may be based on a next available opportunity for the UE to perform the acknowledgment feedback transmission. For example, certain resources and/or timing configurations may be configured for acknowledgment feedback transmissions from the UE and/or other UEs. The base station identifying the duration of the eCCA procedures may include the base station adding the processing time/offset parameters of the UE with the random number, and then adding any additional time based on when the next available opportunity is for the UE to perform the corresponding acknowledgment feedback transmissions. For example, the acknowledgement feedback transmissions may be via PUCCH waveform(s), with the next available resource depending on the PUCCH resource set configuration.

Accordingly, the base station may perform the CCA procedures 505, 555, and 575 (e.g., a one-shot LBT procedures) and, if successful, transmit the first grant 510, the second grant 515, and the third grant 520, respectively, to the UE(s) to schedule corresponding downlink transmissions and the corresponding acknowledgment feedback transmissions. The UE(s) may receive the grant(s) and identify or otherwise determine the duration for each eCCA procedure (e.g., the channel clearance procedure to be performed by the UE before transmitting the corresponding acknowledgment feedback transmission). In some aspects, the base station may configure the first grant 510, the second grant 515, and/or the third grant 520 to carry or otherwise convey indications of the start and/or stop time for their respective eCCA procedures. For example, indicating the start time in the grant may enable the UE(s) to skip the other grants. In some aspects, this start time may be included in the processing time/offset parameters.

In some aspects, the UE may identify or otherwise determine the duration for each eCCA procedure based on the transmission timing of the corresponding grant and/or the acknowledgment feedback transmission. For example, the UE may know its own processing time and know when the next available opportunity is to perform the corresponding acknowledgment feedback transmission(s), e.g., based on the PUCCH resource set configuration. The UE may assume a default or minimum random number used by the base station for determining the duration of each eCCA procedures. Accordingly, the UE may add its processing time to the random number and, if any, the time until the next available opportunity for the corresponding acknowledgment feedback transmissions. This time may provide or otherwise convey an indication of the duration of the eCCA procedures.

Accordingly, the UE may perform the eCCA procedure (e.g., the channel clearance procedure) using the identified duration. If the eCCA procedure is successful (e.g., based on energy detected on the channel and/or wireless transmissions detected on the channel being below a threshold), the UE may transmit the corresponding acknowledgment feedback transmissions to the base station. As discussed, the acknowledgment feedback transmissions generally conveys an indication of whether or not the UE was able to successfully receive and decode the corresponding scheduling grant. In the situation where the first grant 510, the second grant 515, and the third grant 520 are for the different UEs, the eCCA procedure 525 may be performed by the first UE before transmitting the first acknowledgement transmission 530 responsive to the first grant 510. In this situation, each of the other UEs may implement the described techniques to determine the duration for their respective eCCA procedures before transmitting the second acknowledgement transmission 535 responsive to the second grant 515, the third acknowledgement transmission 540 responsive to the third grant 520, and so forth.

Based on receiving the acknowledgment feedback transmission(s), the base station may perform a one-shot CCA procedure and, if successful, transmit the data transmission(s) to the UE(s). The UE(s) may then perform a one-shot CCA procedure and, if successful, transmit corresponding second acknowledgment feedback transmission(s) to the base station confirming that the UE(s) was/were able to receive and decode the data transmission(s).

Figure 6:
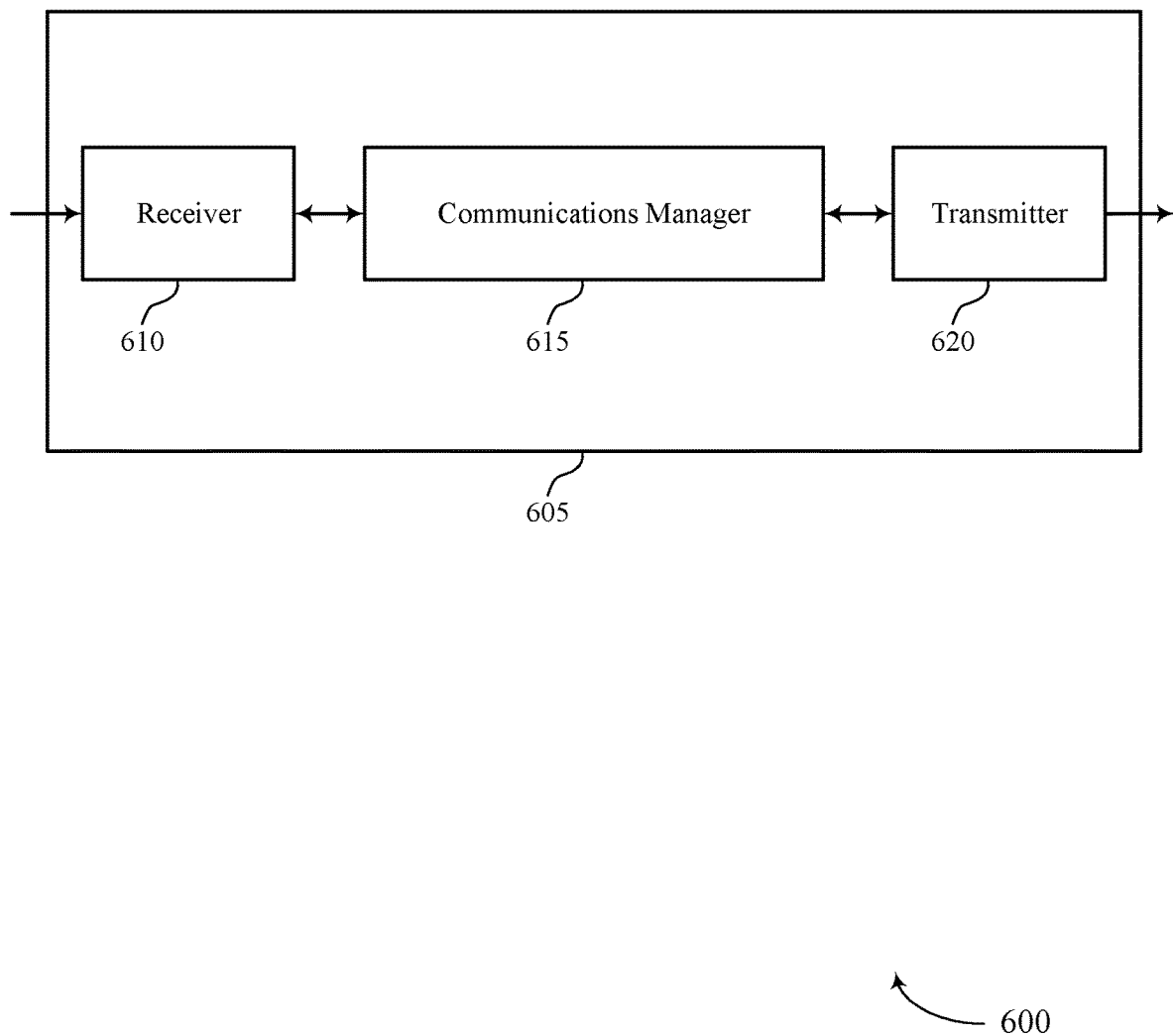
FIGS. 6 and 7 show block diagrams of devices that support UE side eCCA length indication in accordance with aspects of the present disclosure.

FIG. 6 shows a block diagram 600 of a device 605 that supports UE side eCCA length indication in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to UE side eCCA length indication, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive a grant scheduling an acknowledgement feedback transmission for the grant, identify, based on a first timing associated with the grant, a second timing associated with the acknowledgment feedback transmission, or a combination thereof, a duration for a channel clearance procedure to be performed before transmitting the acknowledgement feedback transmission, perform the channel clearance procedure using the identified duration, and transmit the acknowledgement feedback transmission based on a result of the channel clearance procedure. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
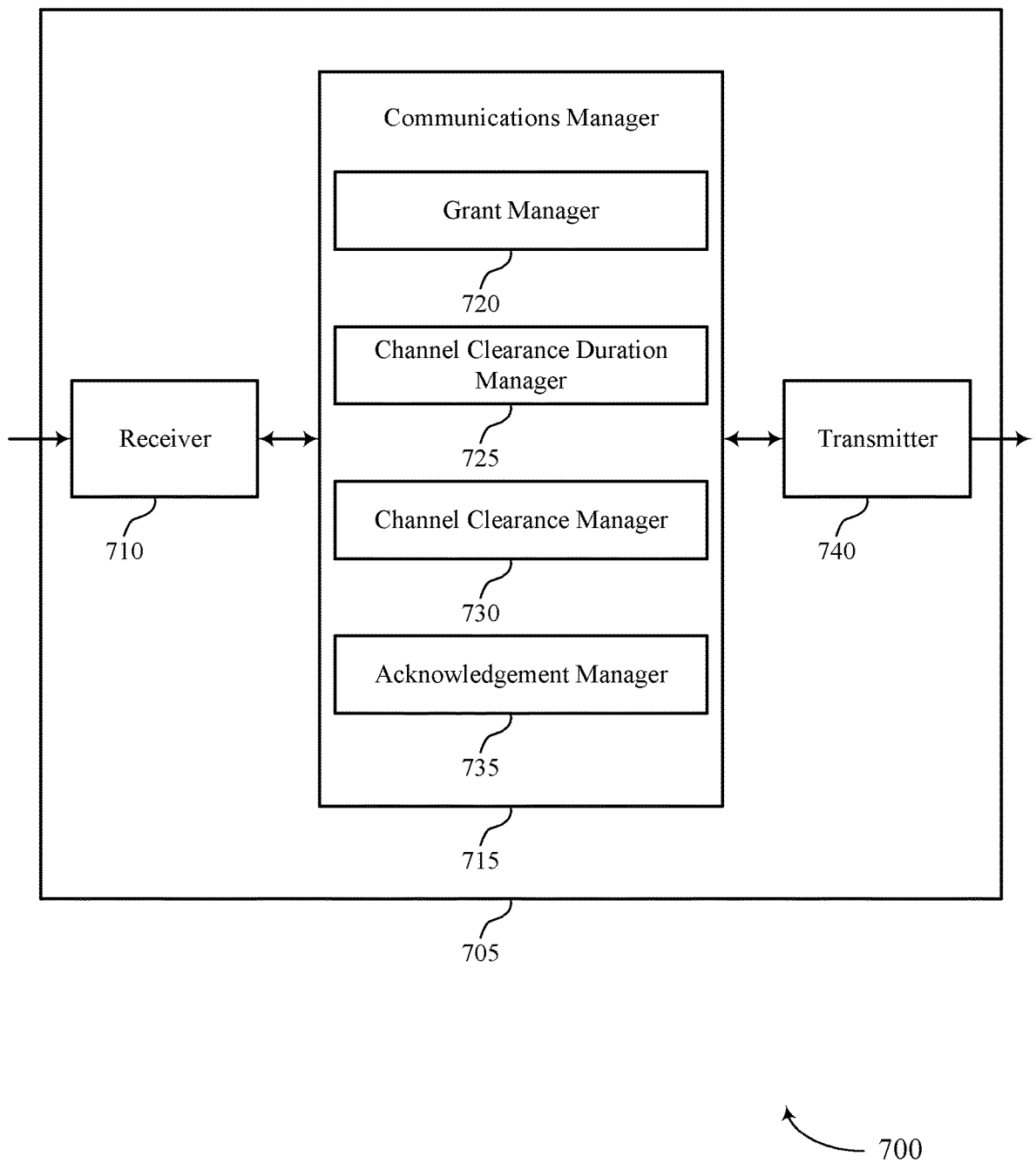

FIG. 7 shows a block diagram 700 of a device 705 that supports UE side eCCA length indication in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to UE side eCCA length indication, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a grant manager 720, a channel clearance duration manager 725, a channel clearance manager 730, and an acknowledgement manager 735. The communications manager 715 may be an example of aspects of the communications manager 910 described herein.

The grant manager 720 may receive a grant scheduling an acknowledgement feedback transmission for the grant.

The channel clearance duration manager 725 may identify, based on a first timing associated with the grant, a second timing associated with the acknowledgment feedback transmission, or a combination thereof, a duration for a channel clearance procedure to be performed before transmitting the acknowledgement feedback transmission.

The channel clearance manager 730 may perform the channel clearance procedure using the identified duration.

The acknowledgement manager 735 may transmit the acknowledgement feedback transmission based on a result of the channel clearance procedure.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
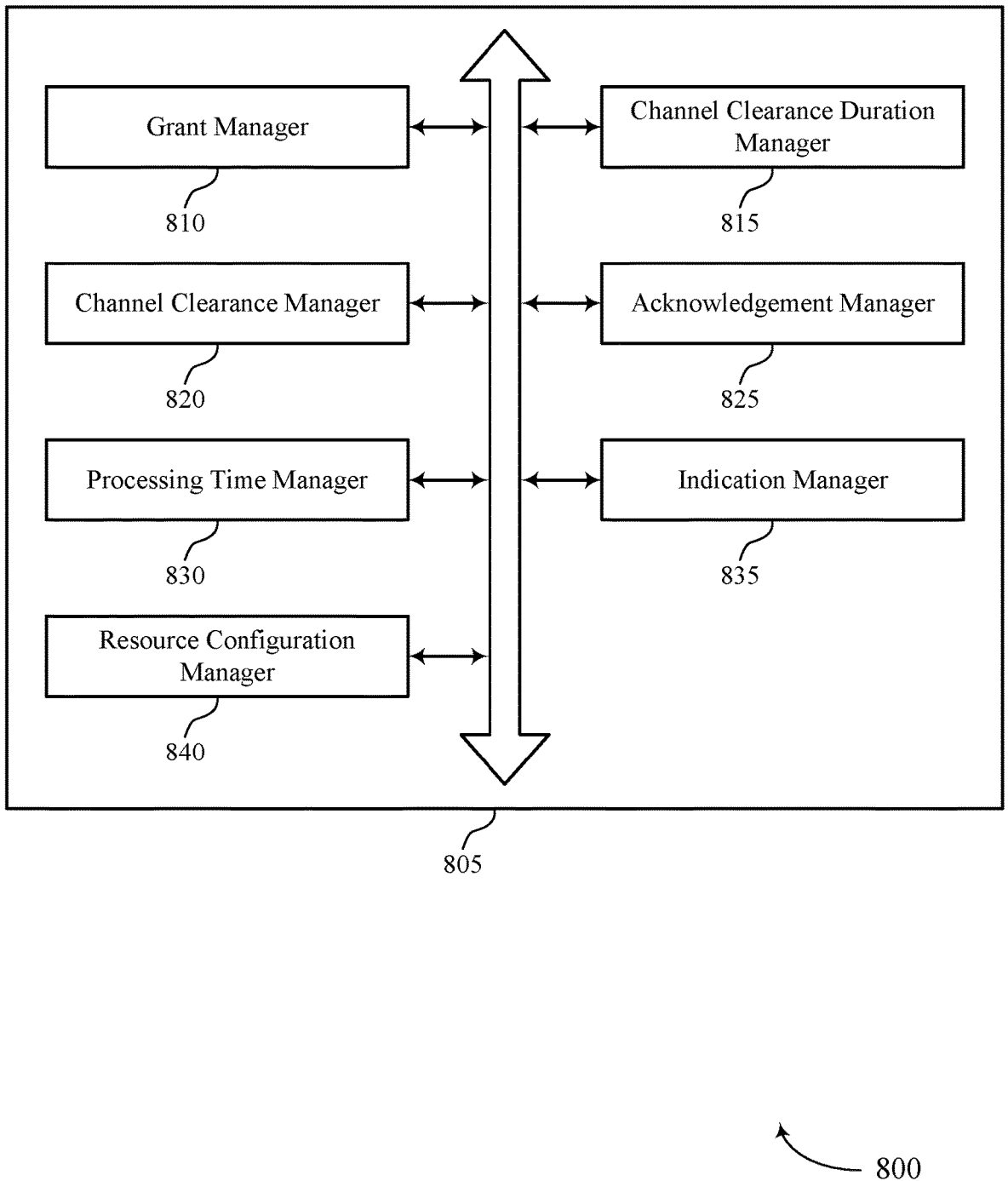
FIG. 8 shows a block diagram of a communications manager that supports UE side eCCA length indication in accordance with aspects of the present disclosure.

FIG. 8 shows a block diagram 800 of a communications manager 805 that supports UE side eCCA length indication in accordance with aspects of the present disclosure. The communications manager 805 may be an example of aspects of a communications manager 615, a communications manager 715, or a communications manager 910 described herein. The communications manager 805 may include a grant manager 810, a channel clearance duration manager 815, a channel clearance manager 820, an acknowledgement manager 825, a processing time manager 830, an indication manager 835, and a resource configuration manager 840. Each of these modules may communicate, directly or indirectly, with one another (e.g., via one or more buses).

The grant manager 810 may receive a grant scheduling an acknowledgement feedback transmission for the grant.

The channel clearance duration manager 815 may identify, based on a first timing associated with the grant, a second timing associated with the acknowledgment feedback transmission, or a combination thereof, a duration for a channel clearance procedure to be performed before transmitting the acknowledgement feedback transmission. In some cases, the first timing associated with the receive time of the grant includes at least one of a start time of the grant, or an end time of the grant, or a combination thereof.

The channel clearance manager 820 may perform the channel clearance procedure using the identified duration.

The acknowledgement manager 825 may transmit the acknowledgement feedback transmission based on a result of the channel clearance procedure.

The processing time manager 830 may identify a processing time parameter associated with the UE, where the duration of the channel clearance procedure is further based on the processing time parameter.

In some examples, the processing time manager 830 may transmit a UE capability message indicating the processing time parameter associated with the UE.

The indication manager 835 may receive an indication of at least one of a start time, a stop time, or a combination thereof, for the channel clearance procedure, where the duration of the channel clearance procedure is based on the indication. In some examples, the indication manager 835 may ignore one or more of the sequentially transmitted grants based on the received indication. In some examples, the indication manager 835 may ignore one or more of the sequential acknowledgment feedback opportunities based on the received indication. In some cases, the grant or a downlink control information block associated with the grant.

The resource configuration manager 840 may identify a resource configuration to be used for the acknowledgement feedback transmission. In some examples, the resource configuration manager 840 may determine the second timing associated with the acknowledgement feedback transmission based on the resource configuration.

Figure 9:
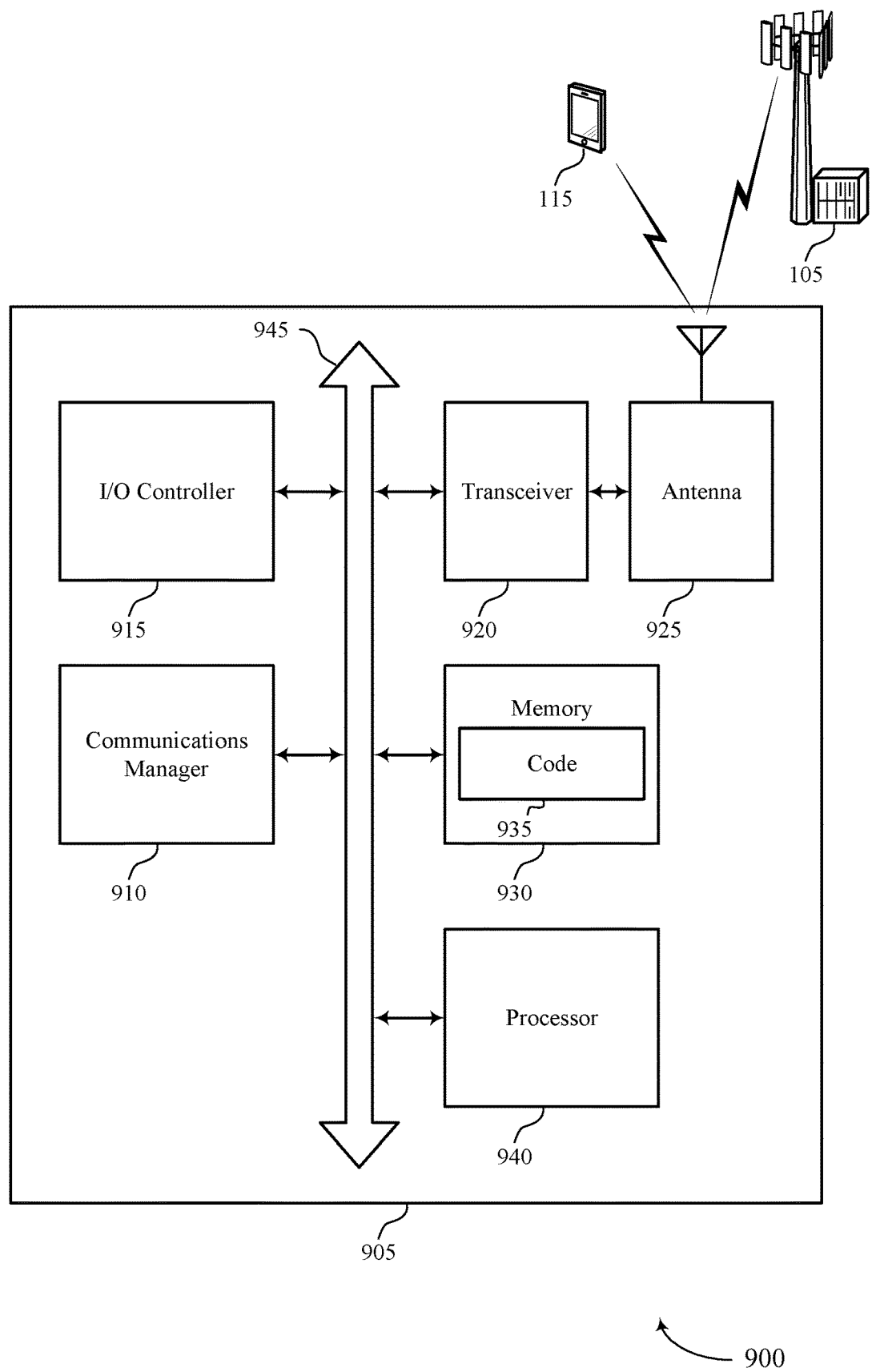
FIG. 9 shows a diagram of a system including a device that supports UE side eCCA length indication in accordance with aspects of the present disclosure.

FIG. 9 shows a diagram of a system 900 including a device 905 that supports UE side eCCA length indication in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive a grant scheduling an acknowledgement feedback transmission for the grant, identify, based on a first timing associated with the grant, a second timing associated with the acknowledgment feedback transmission, or a combination thereof, a duration for a channel clearance procedure to be performed before transmitting the acknowledgement feedback transmission, perform the channel clearance procedure using the identified duration, and transmit the acknowledgement feedback transmission based on a result of the channel clearance procedure.

The input/output (I/O) controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting UE side eCCA length indication).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
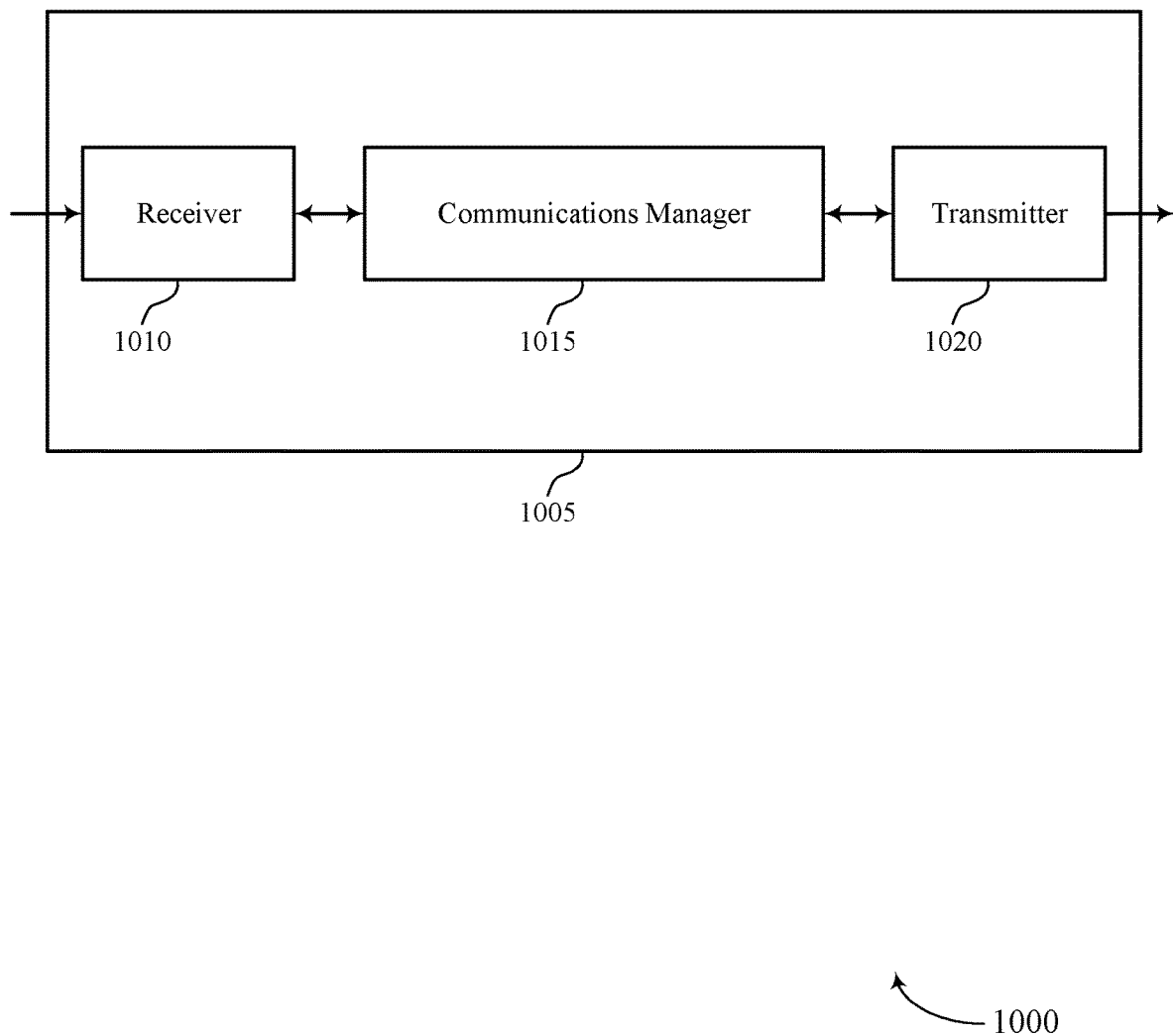
FIGS. 10 and 11 show block diagrams of devices that support UE side eCCA length indication in accordance with aspects of the present disclosure.

FIG. 10 shows a block diagram 1000 of a device 1005 that supports UE side eCCA length indication in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to UE side eCCA length indication, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify a processing time parameter associated with a UE, identify, based on a first timing associated with a grant, a second timing associated with an acknowledgment feedback transmission, the processing time parameter, or a combination thereof, a duration for a channel clearance procedure to be performed by the UE, transmit the grant scheduling the acknowledgement feedback transmission for the grant, and receive the acknowledgement feedback transmission based on a result of the channel clearance procedure performed by the UE. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
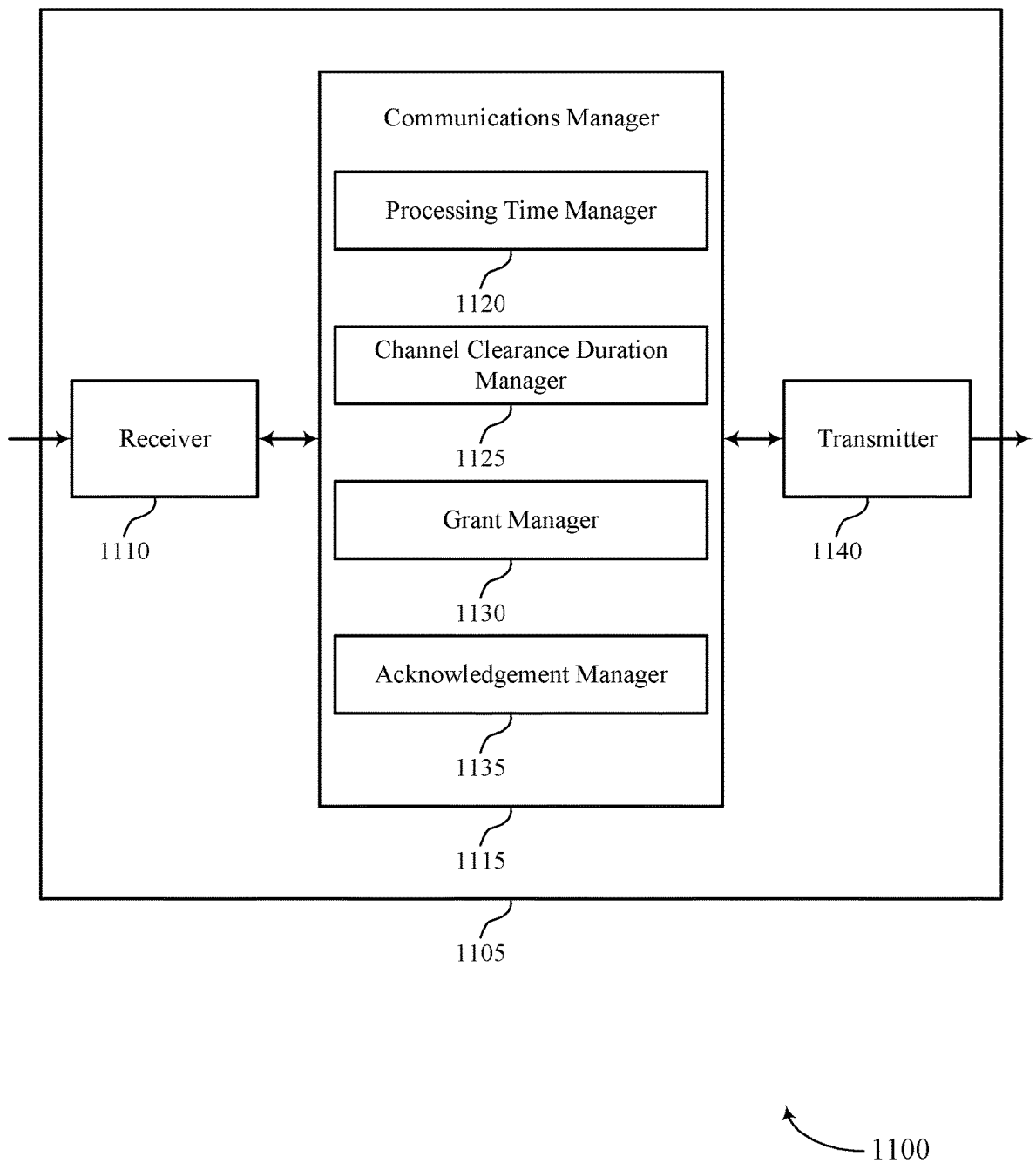

FIG. 11 shows a block diagram 1100 of a device 1105 that supports UE side eCCA length indication in accordance with aspects of the present disclosure. The device 1105 may be an example of aspects of a device 1005, or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to UE side eCCA length indication, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a processing time manager 1120, a channel clearance duration manager 1125, a grant manager 1130, and an acknowledgement manager 1135. The communications manager 1115 may be an example of aspects of the communications manager 1310 described herein.

The processing time manager 1120 may identify a processing time parameter associated with a UE.

The channel clearance duration manager 1125 may identify, based on a first timing associated with a grant, a second timing associated with an acknowledgment feedback transmission, the processing time parameter, or a combination thereof, a duration for a channel clearance procedure to be performed by the UE.

The grant manager 1130 may transmit the grant scheduling the acknowledgement feedback transmission for the grant.

The acknowledgement manager 1135 may receive the acknowledgement feedback transmission based on a result of the channel clearance procedure performed by the UE.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
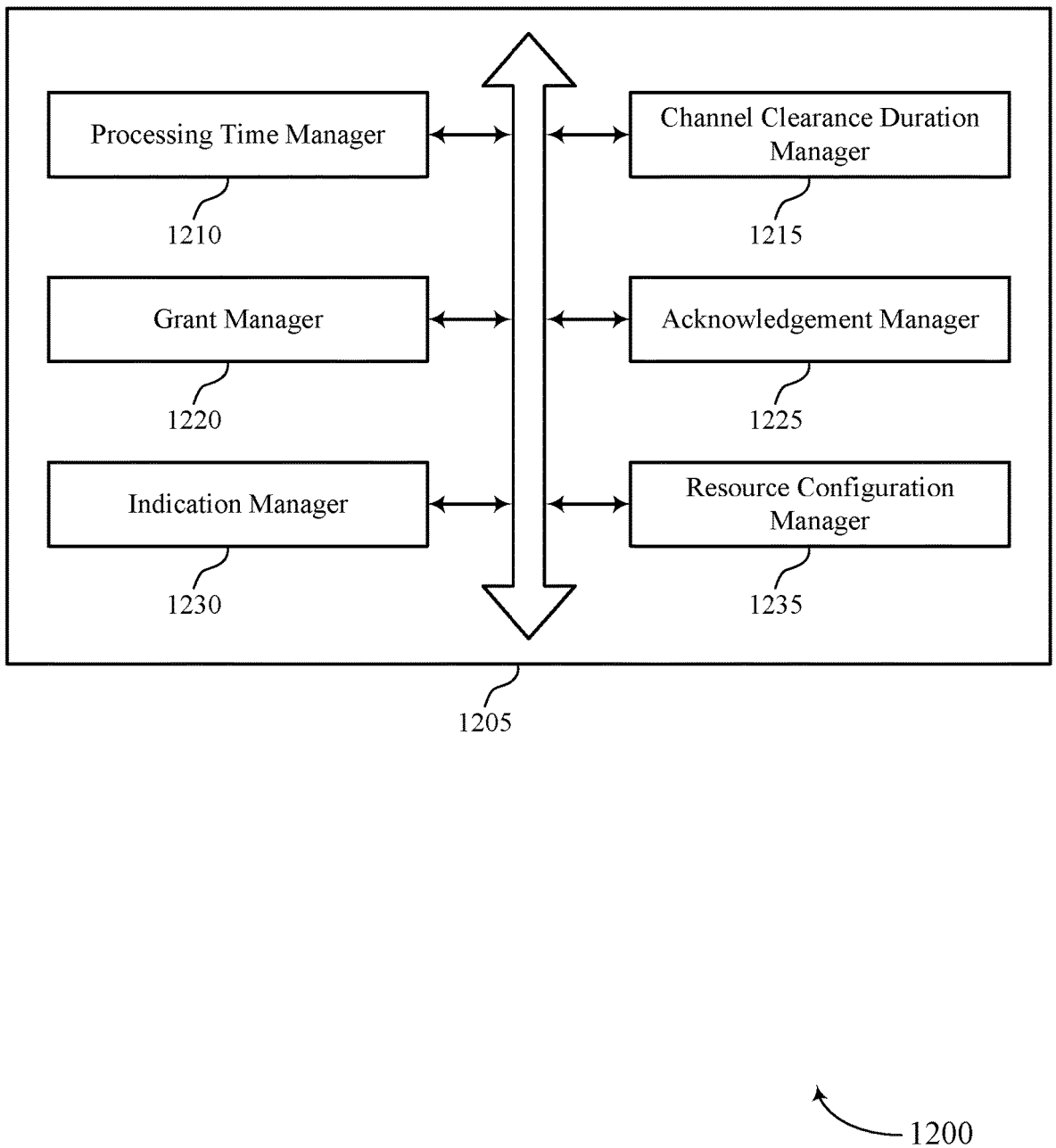
FIG. 12 shows a block diagram of a communications manager that supports UE side eCCA length indication in accordance with aspects of the present disclosure.

FIG. 12 shows a block diagram 1200 of a communications manager 1205 that supports UE side eCCA length indication in accordance with aspects of the present disclosure. The communications manager 1205 may be an example of aspects of a communications manager 1015, a communications manager 1115, or a communications manager 1310 described herein. The communications manager 1205 may include a processing time manager 1210, a channel clearance duration manager 1215, a grant manager 1220, an acknowledgement manager 1225, an indication manager 1230, and a resource configuration manager 1235. Each of these modules may communicate, directly or indirectly, with one another (e.g., via one or more buses).

The processing time manager 1210 may identify a processing time parameter associated with a UE. In some examples, the processing time manager 1210 may receive a UE capability message indicating the processing time parameter associated with the UE.

The channel clearance duration manager 1215 may identify, based on a first timing associated with a grant, a second timing associated with an acknowledgment feedback transmission, the processing time parameter, or a combination thereof, a duration for a channel clearance procedure to be performed by the UE. In some examples, the channel clearance duration manager 1215 may generate a random number that defines a minimum duration for the channel clearance procedure, where the duration of the channel clearance procedure is based on the minimum duration. In some examples, the channel clearance duration manager 1215 may select, based on the processing time parameter and the minimum duration, a grant transmission opportunity from a set of available grant transmission opportunities configured for the base station, where the first timing is based on the selected grant transmission opportunity.

In some examples, the channel clearance duration manager 1215 may select, based on the processing time parameter, the minimum duration, and the selected grant transmission opportunity, an acknowledgement feedback transmission opportunity from a set of available acknowledgement feedback transmission opportunities configured for the UE, where the second timing is based on the selected acknowledgement transmission opportunity. In some cases, the first timing associated with the grant includes at least one of a start time of the grant, or an end time of the grant, or a combination thereof.

The grant manager 1220 may transmit the grant scheduling the acknowledgement feedback transmission for the grant.

The acknowledgement manager 1225 may receive the acknowledgement feedback transmission based on a result of the channel clearance procedure performed by the UE.

The indication manager 1230 may transmit an indication of at least one of a start time, a stop time, or a combination thereof, for the channel clearance procedure, where the duration of the channel clearance procedure is based on the indication. In some cases, the grant or a downlink control information block associated with the grant. In some cases, the grant includes one of a set of sequentially transmitted grants. In some cases, the acknowledgement feedback transmission occurs at an acknowledgment feedback opportunity in a set of sequential acknowledgment feedback opportunities.

The resource configuration manager 1235 may identify a resource configuration to be used for the acknowledgement feedback reception. In some examples, the resource configuration manager 1235 may determine the second timing associated with the acknowledgement feedback transmission based on the resource configuration.

Figure 13:
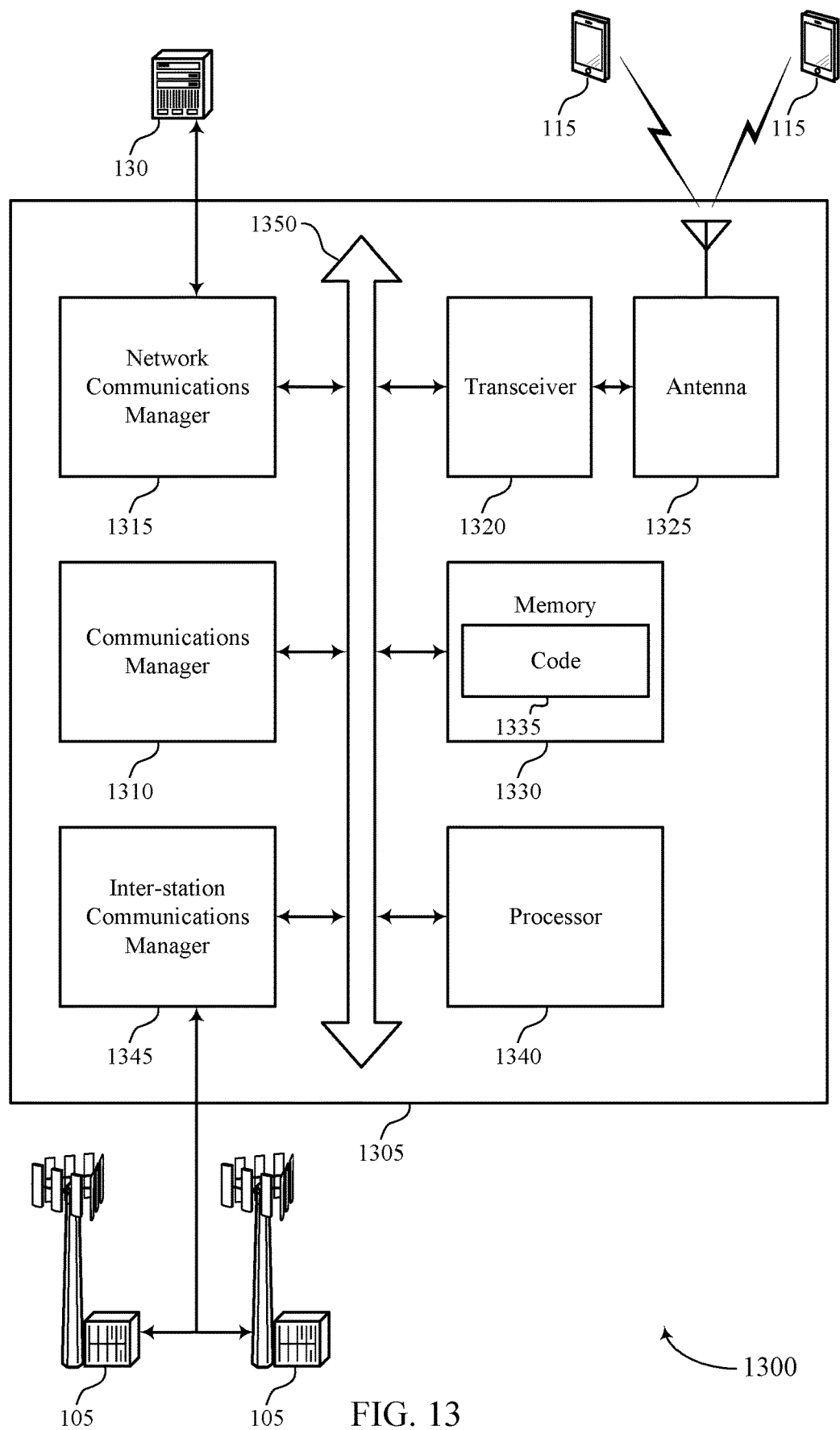
FIG. 13 shows a diagram of a system including a device that supports UE side eCCA length indication in accordance with aspects of the present disclosure.

FIG. 13 shows a diagram of a system 1300 including a device 1305 that supports UE side eCCA length indication in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify a processing time parameter associated with a UE, identify, based on a first timing associated with a grant, a second timing associated with an acknowledgment feedback transmission, the processing time parameter, or a combination thereof, a duration for a channel clearance procedure to be performed by the UE, transmit the grant scheduling the acknowledgement feedback transmission for the grant, and receive the acknowledgement feedback transmission based on a result of the channel clearance procedure performed by the UE.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting UE side eCCA length indication).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
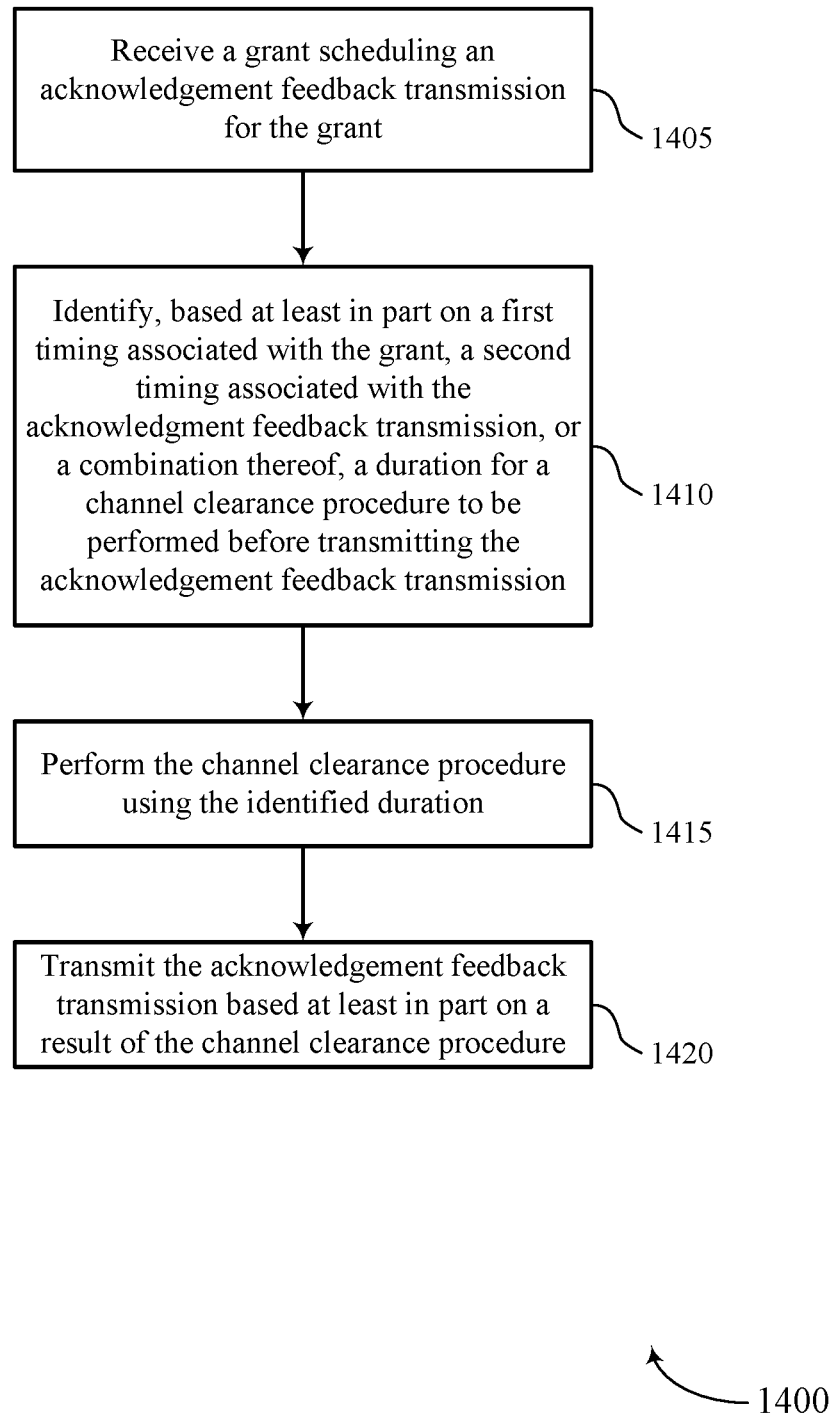
FIGS. 14 through 18 show flowcharts illustrating methods that support UE side eCCA length indication in accordance with aspects of the present disclosure.

FIG. 14 shows a flowchart illustrating a method 1400 that supports UE side eCCA length indication in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive a grant scheduling an acknowledgement feedback transmission for the grant. The operations of 1405 may be performed according to the methods described herein. In some examples, aspects of the operations of 1405 may be performed by a grant manager as described with reference to FIGS. 6 through 9.

At 1410, the UE may identify, based at least in part on a first timing associated with the grant, a second timing associated with the acknowledgment feedback transmission, or a combination thereof, a duration for a channel clearance procedure to be performed before transmitting the acknowledgement feedback transmission. The operations of 1410 may be performed according to the methods described herein. In some examples, aspects of the operations of 1410 may be performed by a channel clearance duration manager as described with reference to FIGS. 6 through 9.

At 1415, the UE may perform the channel clearance procedure using the identified duration. The operations of 1415 may be performed according to the methods described herein. In some examples, aspects of the operations of 1415 may be performed by a channel clearance manager as described with reference to FIGS. 6 through 9.

At 1420, the UE may transmit the acknowledgement feedback transmission based at least in part on a result of the channel clearance procedure. The operations of 1420 may be performed according to the methods described herein. In some examples, aspects of the operations of 1420 may be performed by an acknowledgement manager as described with reference to FIGS. 6 through 9.

Figure 15:
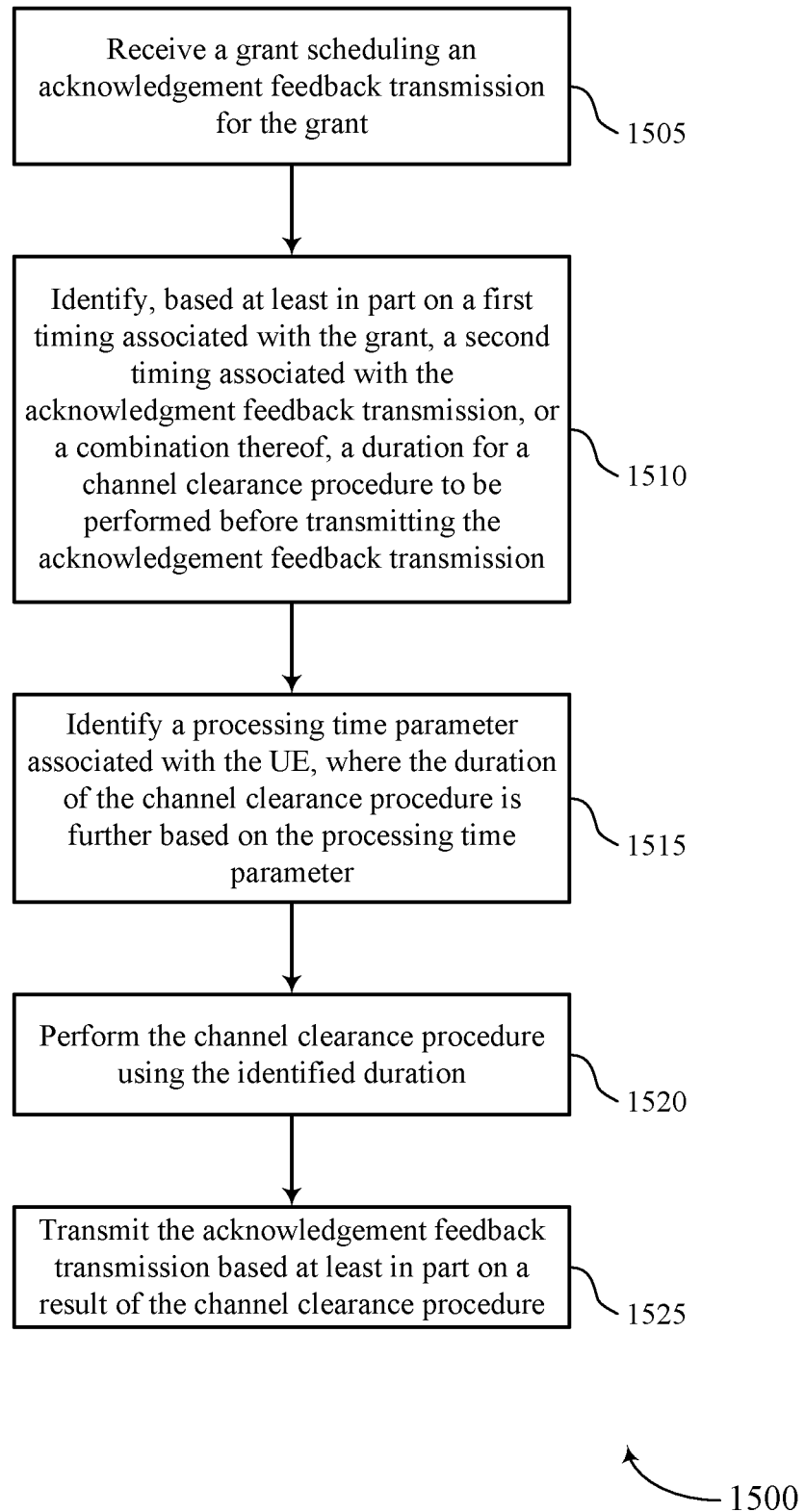

FIG. 15 shows a flowchart illustrating a method 1500 that supports UE side eCCA length indication in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive a grant scheduling an acknowledgement feedback transmission for the grant. The operations of 1505 may be performed according to the methods described herein. In some examples, aspects of the operations of 1505 may be performed by a grant manager as described with reference to FIGS. 6 through 9.

At 1510, the UE may identify, based at least in part on a first timing associated with the grant, a second timing associated with the acknowledgment feedback transmission, or a combination thereof, a duration for a channel clearance procedure to be performed before transmitting the acknowledgement feedback transmission. The operations of 1510 may be performed according to the methods described herein. In some examples, aspects of the operations of 1510 may be performed by a channel clearance duration manager as described with reference to FIGS. 6 through 9.

At 1515, the UE may identify a processing time parameter associated with the UE, where the duration of the channel clearance procedure is further based on the processing time parameter. The operations of 1515 may be performed according to the methods described herein. In some examples, aspects of the operations of 1515 may be performed by a processing time manager as described with reference to FIGS. 6 through 9.

At 1520, the UE may perform the channel clearance procedure using the identified duration. The operations of 1520 may be performed according to the methods described herein. In some examples, aspects of the operations of 1520 may be performed by a channel clearance manager as described with reference to FIGS. 6 through 9.

At 1525, the UE may transmit the acknowledgement feedback transmission based at least in part on a result of the channel clearance procedure. The operations of 1525 may be performed according to the methods described herein. In some examples, aspects of the operations of 1525 may be performed by an acknowledgement manager as described with reference to FIGS. 6 through 9.

Figure 16:
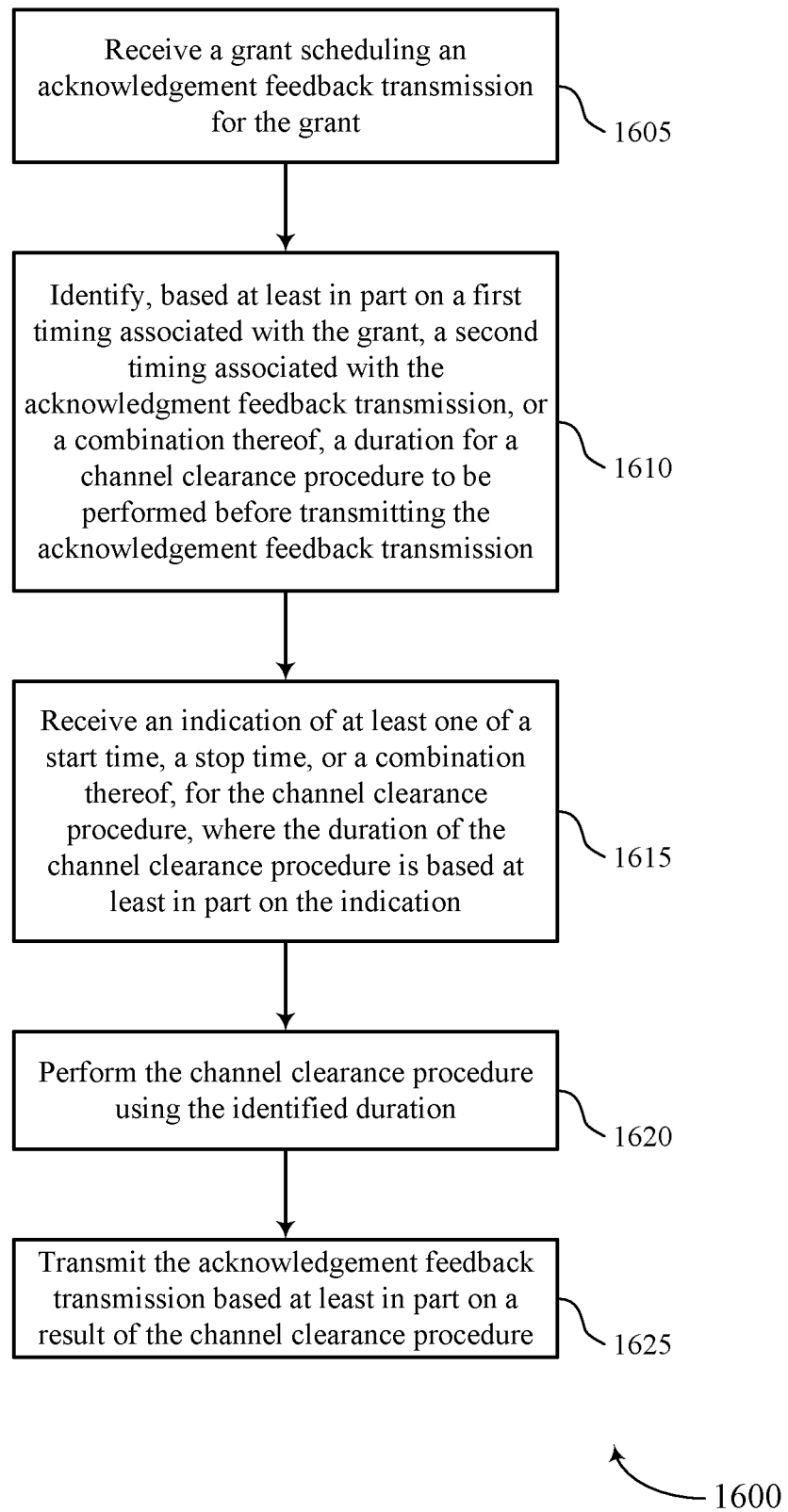

FIG. 16 shows a flowchart illustrating a method 1600 that supports UE side eCCA length indication in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive a grant scheduling an acknowledgement feedback transmission for the grant. The operations of 1605 may be performed according to the methods described herein. In some examples, aspects of the operations of 1605 may be performed by a grant manager as described with reference to FIGS. 6 through 9.

At 1610, the UE may identify, based at least in part on a first timing associated with the grant, a second timing associated with the acknowledgment feedback transmission, or a combination thereof, a duration for a channel clearance procedure to be performed before transmitting the acknowledgement feedback transmission. The operations of 1610 may be performed according to the methods described herein. In some examples, aspects of the operations of 1610 may be performed by a channel clearance duration manager as described with reference to FIGS. 6 through 9.

At 1615, the UE may receive an indication of at least one of a start time, a stop time, or a combination thereof, for the channel clearance procedure, where the duration of the channel clearance procedure is based at least in part on the indication. The operations of 1615 may be performed according to the methods described herein. In some examples, aspects of the operations of 1615 may be performed by an indication manager as described with reference to FIGS. 6 through 9.

At 1620, the UE may perform the channel clearance procedure using the identified duration. The operations of 1620 may be performed according to the methods described herein. In some examples, aspects of the operations of 1620 may be performed by a channel clearance manager as described with reference to FIGS. 6 through 9.

At 1625, the UE may transmit the acknowledgement feedback transmission based at least in part on a result of the channel clearance procedure. The operations of 1625 may be performed according to the methods described herein. In some examples, aspects of the operations of 1625 may be performed by an acknowledgement manager as described with reference to FIGS. 6 through 9.

Figure 17:
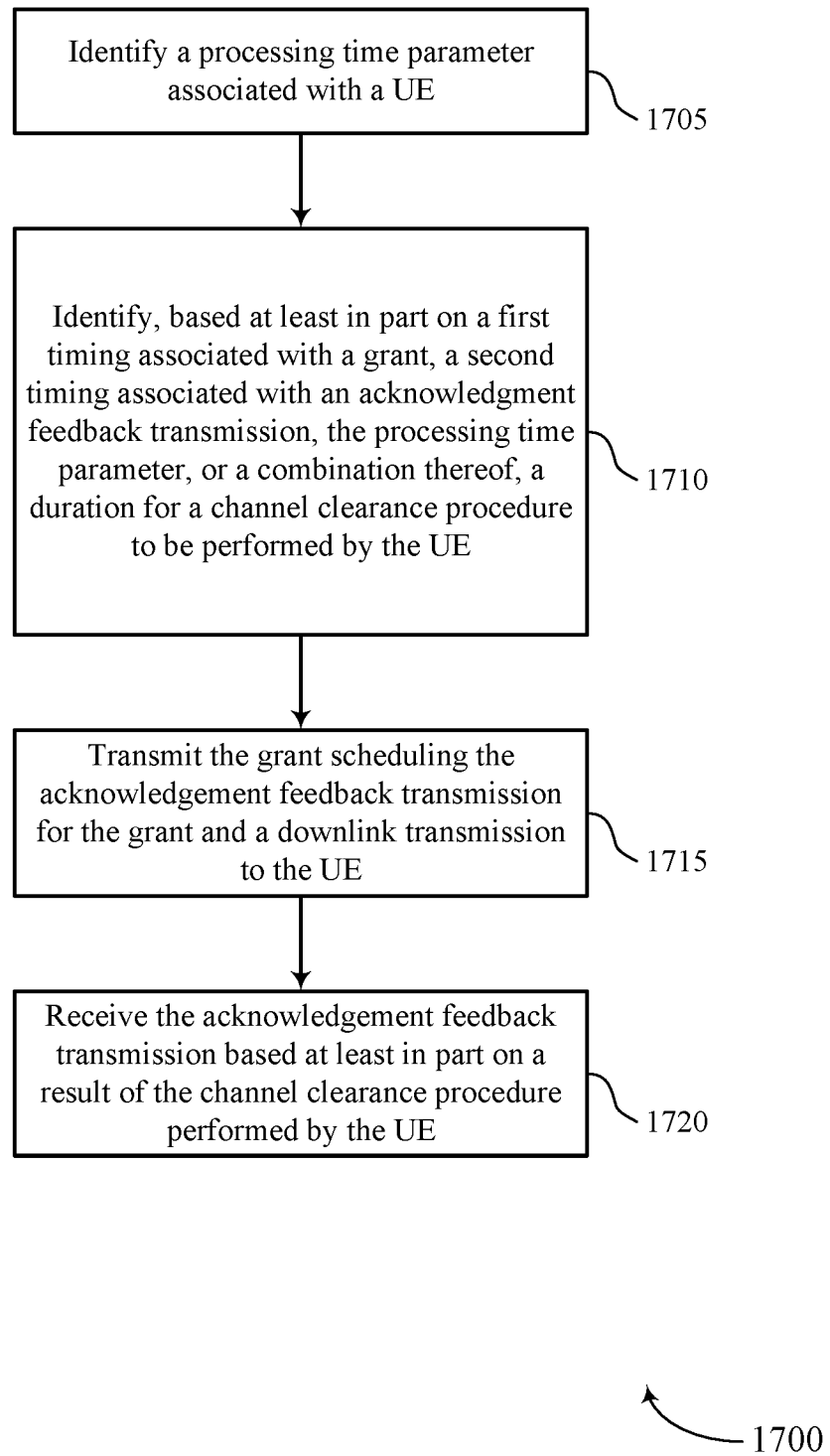

FIG. 17 shows a flowchart illustrating a method 1700 that supports UE side eCCA length indication in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may identify a processing time parameter associated with a UE. The operations of 1705 may be performed according to the methods described herein. In some examples, aspects of the operations of 1705 may be performed by a processing time manager as described with reference to FIGS. 10 through 13.

At 1710, the base station may identify, based at least in part on a first timing associated with a grant, a second timing associated with an acknowledgment feedback transmission, the processing time parameter, or a combination thereof, a duration for a channel clearance procedure to be performed by the UE. The operations of 1710 may be performed according to the methods described herein. In some examples, aspects of the operations of 1710 may be performed by a channel clearance duration manager as described with reference to FIGS. 10 through 13.

At 1715, the base station may transmit the grant scheduling the acknowledgement feedback transmission for the grant. The operations of 1715 may be performed according to the methods described herein. In some examples, aspects of the operations of 1715 may be performed by a grant manager as described with reference to FIGS. 10 through 13.

At 1720, the base station may receive the acknowledgement feedback transmission based at least in part on a result of the channel clearance procedure performed by the UE. The operations of 1720 may be performed according to the methods described herein. In some examples, aspects of the operations of 1720 may be performed by an acknowledgement manager as described with reference to FIGS. 10 through 13.

Figure 18:
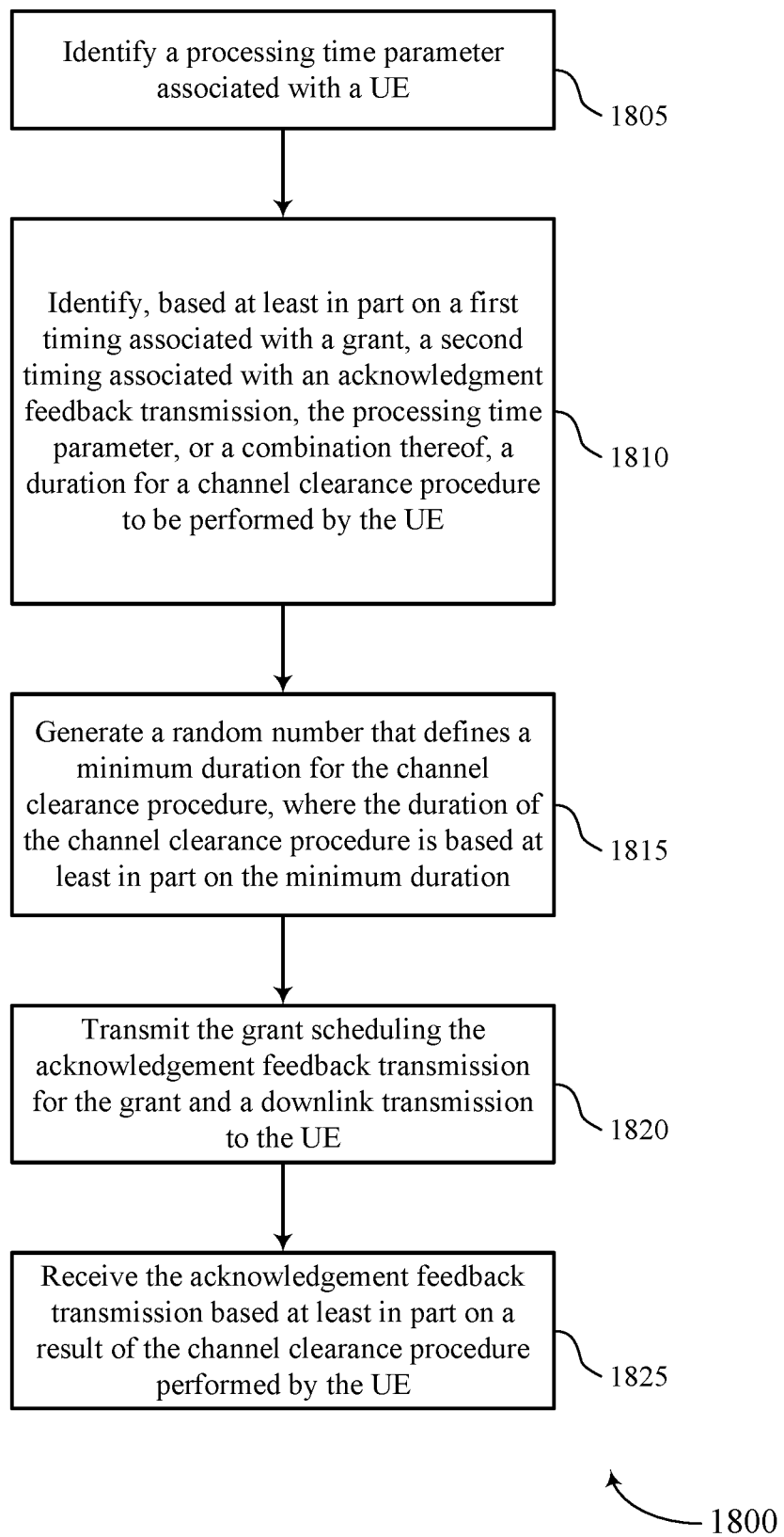

FIG. 18 shows a flowchart illustrating a method 1800 that supports UE side eCCA length indication in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may identify a processing time parameter associated with a UE. The operations of 1805 may be performed according to the methods described herein. In some examples, aspects of the operations of 1805 may be performed by a processing time manager as described with reference to FIGS. 10 through 13.

At 1810, the base station may identify, based at least in part on a first timing associated with a grant, a second timing associated with an acknowledgment feedback transmission, the processing time parameter, or a combination thereof, a duration for a channel clearance procedure to be performed by the UE. The operations of 1810 may be performed according to the methods described herein. In some examples, aspects of the operations of 1810 may be performed by a channel clearance duration manager as described with reference to FIGS. 10 through 13.

At 1815, the base station may generate a random number that defines a minimum duration for the channel clearance procedure, where the duration of the channel clearance procedure is based at least in part on the minimum duration. The operations of 1815 may be performed according to the methods described herein. In some examples, aspects of the operations of 1815 may be performed by a channel clearance duration manager as described with reference to FIGS. 10 through 13.

At 1820, the base station may transmit the grant scheduling the acknowledgement feedback transmission for the grant. The operations of 1820 may be performed according to the methods described herein. In some examples, aspects of the operations of 1820 may be performed by a grant manager as described with reference to FIGS. 10 through 13.

At 1825, the base station may receive the acknowledgement feedback transmission based at least in part on a result of the channel clearance procedure performed by the UE. The operations of 1825 may be performed according to the methods described herein. In some examples, aspects of the operations of 1825 may be performed by an acknowledgement manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving a grant scheduling an acknowledgement feedback transmission for the grant; identifying, based at least in part on a first timing associated with the grant, a second timing associated with the acknowledgment feedback transmission, or a combination thereof, a duration for a channel clearance procedure to be performed before transmitting the acknowledgement feedback transmission; performing the channel clearance procedure using the identified duration; and transmitting the acknowledgement feedback transmission based at least in part on a result of the channel clearance procedure.

Aspect 2: The method of aspect 1, further comprising: identifying a processing time parameter associated with the UE, wherein the duration of the channel clearance procedure is further based at least in part on the processing time parameter.

Aspect 3: The method of aspect 2, further comprising: transmitting a UE capability message indicating the processing time parameter associated with the UE.

Aspect 4: The method of any of aspects 1 through 3, further comprising: receiving an indication of at least one of a start time, a stop time, or a combination thereof, for the channel clearance procedure, wherein the duration of the channel clearance procedure is based at least in part on the indication.

Aspect 5: The method of aspect 4, wherein the indication is received in one or more of the grant or a downlink control information block associated with the grant.

Aspect 6: The method of any of aspects 4 through 5, wherein the grant comprises one of a plurality of sequentially transmitted grants, and further comprising: ignoring one or more of the sequentially transmitted grants based at least in part on the received indication.

Aspect 7: The method of any of aspects 4 through 6, wherein the acknowledgement feedback transmission occurs at an acknowledgment feedback opportunity in a plurality of sequential acknowledgment feedback opportunities, and further comprising: ignoring one or more of the sequential acknowledgment feedback opportunities based at least in part on the received indication.

Aspect 8: The method of any of aspects 1 through 7, further comprising: identifying a resource configuration to be used for the acknowledgement feedback transmission; and determining the second timing associated with the acknowledgement feedback transmission based at least in part on the resource configuration.

Aspect 9: The method of any of aspects 1 through 8, wherein the first timing associated with the receive time of the grant comprises at least one of a start time of the grant, or an end time of the grant, or a combination thereof.

Aspect 10: A method for wireless communication at a base station, comprising: identifying a processing time parameter associated with a UE; identifying, based at least in part on a first timing associated with a grant, a second timing associated with an acknowledgment feedback transmission, the processing time parameter, or a combination thereof, a duration for a channel clearance procedure to be performed by the UE; transmitting the grant scheduling the acknowledgement feedback transmission for the grant; and receiving the acknowledgement feedback transmission based at least in part on a result of the channel clearance procedure performed by the UE.

Aspect 11: The method of aspect 10, wherein identifying the duration for the channel clearance procedure comprises: generating a random number that defines a minimum duration for the channel clearance procedure, wherein the duration of the channel clearance procedure is based at least in part on the minimum duration.

Aspect 12: The method of aspect 11, further comprising: selecting, based at least in part on the processing time parameter and the minimum duration, a grant transmission opportunity from a set of available grant transmission opportunities configured for the base station, wherein the first timing is based at least in part on the selected grant transmission opportunity.

Aspect 13: The method of aspect 12, further comprising: selecting, based at least in part on the processing time parameter, the minimum duration, and the selected grant transmission opportunity, an acknowledgement feedback transmission opportunity from a set of available acknowledgement feedback transmission opportunities configured for the UE, wherein the second timing is based at least in part on the selected acknowledgement transmission opportunity.

Aspect 14: The method of any of aspects 10 through 13, further comprising: receiving a UE capability message indicating the processing time parameter associated with the UE.

Aspect 15: The method of any of aspects 10 through 14, further comprising: transmitting an indication of at least one of a start time, a stop time, or a combination thereof, for the channel clearance procedure, wherein the duration of the channel clearance procedure is based at least in part on the indication.

Aspect 16: The method of aspect 15, wherein the indication is transmitted in one or more of the grant or a downlink control information block associated with the grant.

Aspect 17: The method of any of aspects 15 through 16, wherein the grant comprises one of a plurality of sequentially transmitted grants.

Aspect 18: The method of any of aspects 15 through 17, wherein the acknowledgement feedback transmission occurs at an acknowledgment feedback opportunity in a plurality of sequential acknowledgment feedback opportunities.

Aspect 19: The method of any of aspects 10 through 18, further comprising: identifying a resource configuration to be used for the acknowledgement feedback reception; and determining the second timing associated with the acknowledgement feedback transmission based at least in part on the resource configuration.

Aspect 20: The method of any of aspects 10 through 19, wherein the first timing associated with the grant comprises at least one of a start time of the grant, or an end time of the grant, or a combination thereof.

Aspect 21: An apparatus for wireless communication at a UE, comprising a processor; memory coupled with the processor; and instructions stored in the memory and executable by the processor to cause the apparatus to perform a method of any of aspects 1 through 9.

Aspect 22: An apparatus for wireless communication at a UE, comprising at least one means for performing a method of any of aspects 1 through 9.

Aspect 23: A non-transitory computer-readable medium storing code for wireless communication at a UE, the code comprising instructions executable by a processor to perform a method of any of aspects 1 through 9.

Aspect 24: An apparatus for wireless communication at a base station, comprising a processor; memory coupled with the processor; and instructions stored in the memory and executable by the processor to cause the apparatus to perform a method of any of aspects 10 through 20.

Aspect 25: An apparatus for wireless communication at a base station, comprising at least one means for performing a method of any of aspects 10 through 20.

Aspect 26: A non-transitory computer-readable medium storing code for wireless communication at a base station, the code comprising instructions executable by a processor to perform a method of any of aspects 10 through 20.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communication systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving a grant scheduling an acknowledgement feedback transmission for the grant;
    identifying a duration of a channel clearance procedure to be performed before transmitting the acknowledgement feedback transmission, the duration identified based at least in part on a reception timing of the grant and a transmission timing of the acknowledgment feedback transmission;
    performing the channel clearance procedure using the identified duration; and
    transmitting the acknowledgement feedback transmission based at least in part on a result of the channel clearance procedure.

2. The method of claim 1, further comprising:
identifying a processing time parameter associated with the UE, wherein the duration of the channel clearance procedure is further based at least in part on the processing time parameter.

3. The method of claim 2, further comprising:
transmitting a UE capability message indicating the processing time parameter associated with the UE.

4. The method of claim 1, further comprising:
receiving an indication of at least one of a start time, a stop time, or a combination thereof, for the channel clearance procedure, wherein the duration of the channel clearance procedure is based at least in part on the indication.

5. The method of claim 4, wherein the indication is received in one or more of: the grant or a downlink control information block associated with the grant.

6. A method for wireless communication at a network device, comprising:
identifying a processing time parameter associated with a user equipment (UE);
identifying a duration of a channel clearance procedure to be performed by the UE, the duration identified based at least in part on a reception timing associated with of a grant and a transmission timing of an acknowledgment feedback transmission;
transmitting the grant scheduling the acknowledgement feedback transmission for the grant; and
receiving the acknowledgement feedback transmission based at least in part on a result of the channel clearance procedure performed by the UE.

7. The method of claim 6, wherein identifying the duration of the channel clearance procedure comprises:
generating a random number that defines a minimum duration of the channel clearance procedure, wherein the duration of the channel clearance procedure is based at least in part on the minimum duration.

8. The method of claim 7, further comprising:
selecting, based at least in part on the processing time parameter and the minimum duration, a grant transmission opportunity from a set of available grant transmission opportunities configured for the network device, wherein the reception timing is based at least in part on the selected grant transmission opportunity.

9. The method of claim 8, further comprising:
selecting, based at least in part on the processing time parameter, the minimum duration, and the selected grant transmission opportunity, an acknowledgement feedback transmission opportunity from a set of available acknowledgement feedback transmission opportunities configured for the UE, wherein the transmission timing is based at least in part on the selected acknowledgement transmission opportunity.

10. The method of claim 6, further comprising:
receiving a UE capability message indicating the processing time parameter associated with the UE.

11. An apparatus for wireless communication at a user equipment (UE), comprising:
a processor, and
a memory coupled with the processor, wherein the memory comprises instructions executable by the processor to cause the apparatus to:
receive a grant scheduling an acknowledgement feedback transmission for the grant;
identify a duration of a channel clearance procedure to be performed before transmitting the acknowledgement feedback transmission, the duration identified based at least in part on a reception timing of the grant and a transmission timing of the acknowledgment feedback transmission;
perform the channel clearance procedure using the identified duration; and
transmit the acknowledgement feedback transmission based at least in part on a result of the channel clearance procedure.

12. The apparatus of claim 11, wherein the instructions are further executable by the processor to cause the apparatus to:
identify a processing time parameter associated with the UE, wherein the duration of the channel clearance procedure is further based at least in part on the processing time parameter.

13. The apparatus of claim 12, wherein the instructions are further executable by the processor to cause the apparatus to:
transmit a UE capability message indicating the processing time parameter associated with the UE.

14. The apparatus of claim 11, wherein the instructions are further executable by the processor to cause the apparatus to:
receive an indication of at least one of a start time, a stop time, or a combination thereof, for the channel clearance procedure, wherein the duration of the channel clearance procedure is based at least in part on the indication.

15. The apparatus of claim 14, wherein the indication is received in one or more of the grant or a downlink control information block associated with the grant.

16. The apparatus of claim 14, wherein the grant comprises one of a plurality of sequentially transmitted grants, and the instructions are further executable by the processor to cause the apparatus to:
ignore one or more of the sequentially transmitted grants based at least in part on the received indication.

17. The apparatus of claim 14, wherein the acknowledgement feedback transmission occurs at an acknowledgment feedback opportunity in a plurality of sequential acknowledgment feedback opportunities, and further comprising ignoring one or more of the sequential acknowledgment feedback opportunities based at least in part on the received indication.

18. The apparatus of claim 11, wherein the instructions are further executable by the processor to cause the apparatus to:
identify a resource configuration to be used for the acknowledgement feedback transmission; and
determine the transmission timing of the acknowledgement feedback transmission based at least in part on the resource configuration.

19. The apparatus of claim 11, wherein the reception timing of the grant comprises at least one of a start time of the grant, or an end time of the grant, or a combination thereof.

20. An apparatus for wireless communication at a network device, comprising:
a processor, and
a memory coupled with the processor, wherein the memory comprises instructions executable by the processor to cause the apparatus to:
identify a processing time parameter associated with a user equipment (UE);
identify a duration of a channel clearance procedure to be performed by the UE, the duration identified based at least in part on a reception timing of a grant and a transmission timing of an acknowledgment feedback transmission;

transmit the grant scheduling the acknowledgement feedback transmission for the grant; and
receive the acknowledgement feedback transmission based at least in part on a result of the channel clearance procedure performed by the UE.

21. The apparatus of claim 20, wherein the instructions to identify the duration of the channel clearance procedure are executable by the processor to cause the apparatus to:
generate a random number that defines a minimum duration of the channel clearance procedure, wherein the duration of the channel clearance procedure is based at least in part on the minimum duration.

22. The apparatus of claim 21, wherein the instructions are further executable by the processor to cause the apparatus to:
select, based at least in part on the processing time parameter and the minimum duration, a grant transmission opportunity from a set of available grant transmission opportunities configured for the network device, wherein the reception timing is based at least in part on the selected grant transmission opportunity.

23. The apparatus of claim 22, wherein the instructions are further executable by the processor to cause the apparatus to:
select, based at least in part on the processing time parameter, the minimum duration, and the selected grant transmission opportunity, an acknowledgement feedback transmission opportunity from a set of available acknowledgement feedback transmission opportunities configured for the UE, wherein the transmission timing is based at least in part on the selected acknowledgement transmission opportunity.

24. The apparatus of claim 20, wherein the instructions are further executable by the processor to cause the apparatus to:

receive a UE capability message indicating the processing time parameter associated with the UE.

25. The apparatus of claim 20, wherein the instructions are further executable by the processor to cause the apparatus to:
transmit an indication of at least one of a start time, a stop time, or a combination thereof, for the channel clearance procedure, wherein the duration of the channel clearance procedure is based at least in part on the indication.

26. The apparatus of claim 25, wherein the indication is transmitted in one or more of the grant or a downlink control information block associated with the grant.

27. The apparatus of claim 25, wherein the grant comprises one of a plurality of sequentially transmitted grants.

28. The apparatus of claim 25, wherein the acknowledgement feedback transmission occurs at an acknowledgment feedback opportunity in a plurality of sequential acknowledgment feedback opportunities.

29. The apparatus of claim 20, wherein the instructions are further executable by the processor to cause the apparatus to:
identify a resource configuration to be used for the acknowledgement feedback transmission; and
determine the transmission timing of the acknowledgement feedback transmission based at least in part on the resource configuration.

30. The apparatus of claim 20, wherein the reception timing of the grant comprises at least one of a start time of the grant, or an end time of the grant, or a combination thereof.

* * * * *